United States Patent [19]

Wanzenberg

[11] 3,979,205

[45] Sept. 7, 1976

[54] METAL RECOVERY METHOD

[76] Inventor: Fritz W. Wanzenberg, 9 Campbell Lane, Larchmont, N.Y. 10538

[22] Filed: June 19, 1974

[21] Appl. No.: 480,965

Related U.S. Application Data

[63] Continuation-in-part of Ser. No. 132,061, April 7, 1971, Pat. No. 3,819,363, which is a continuation-in-part of Ser. No. 49,455, June 24, 1970, abandoned.

[52] U.S. Cl. .................................. 75/10 R; 75/83; 423/22
[51] Int. Cl.² .......................................... C22D 7/00
[58] Field of Search ................. 75/83, 10 R; 423/22

[56] References Cited
UNITED STATES PATENTS 3,819,363   6/1974   Wanzenberg .......................... 75/83

Primary Examiner—M. J. Andrews
Attorney, Agent, or Firm—Robert M. Ward; Guy A. Greenawalt

[57] ABSTRACT

The present invention is a method of treating sea or land carbonaceous ore or reconstituted, formerly carbonaceous ore to recover therefrom noble metal values. If sea ore is used, noble metal containing composite organic material is first separated from any shells or sand that may be present. Flotation techniques are then utilized to form a carbonaceous concentrate, which is next mixed with a strong oxidizing agent. The mixture may either be heated to provide autogenously ignition or ignition may alternatively be accomplished by compounding the mixture into electrodes and using electric arc. If stoichiometric quantities of the oxidizing agent are used, the oxidation-reduction reaction, which consumes all carbon present, is of sufficient energy to drive the noble metals and/or their compounds into the vapor phase forming a particulate plasma, from which the elemental metals or their compounds may be condensed and/or precipitated. If non-stoichiometric quantities of oxidant are used, recovery of the sought metals may be had from the ash by techniques well known to those skilled in the art.

34 Claims, 7 Drawing Figures

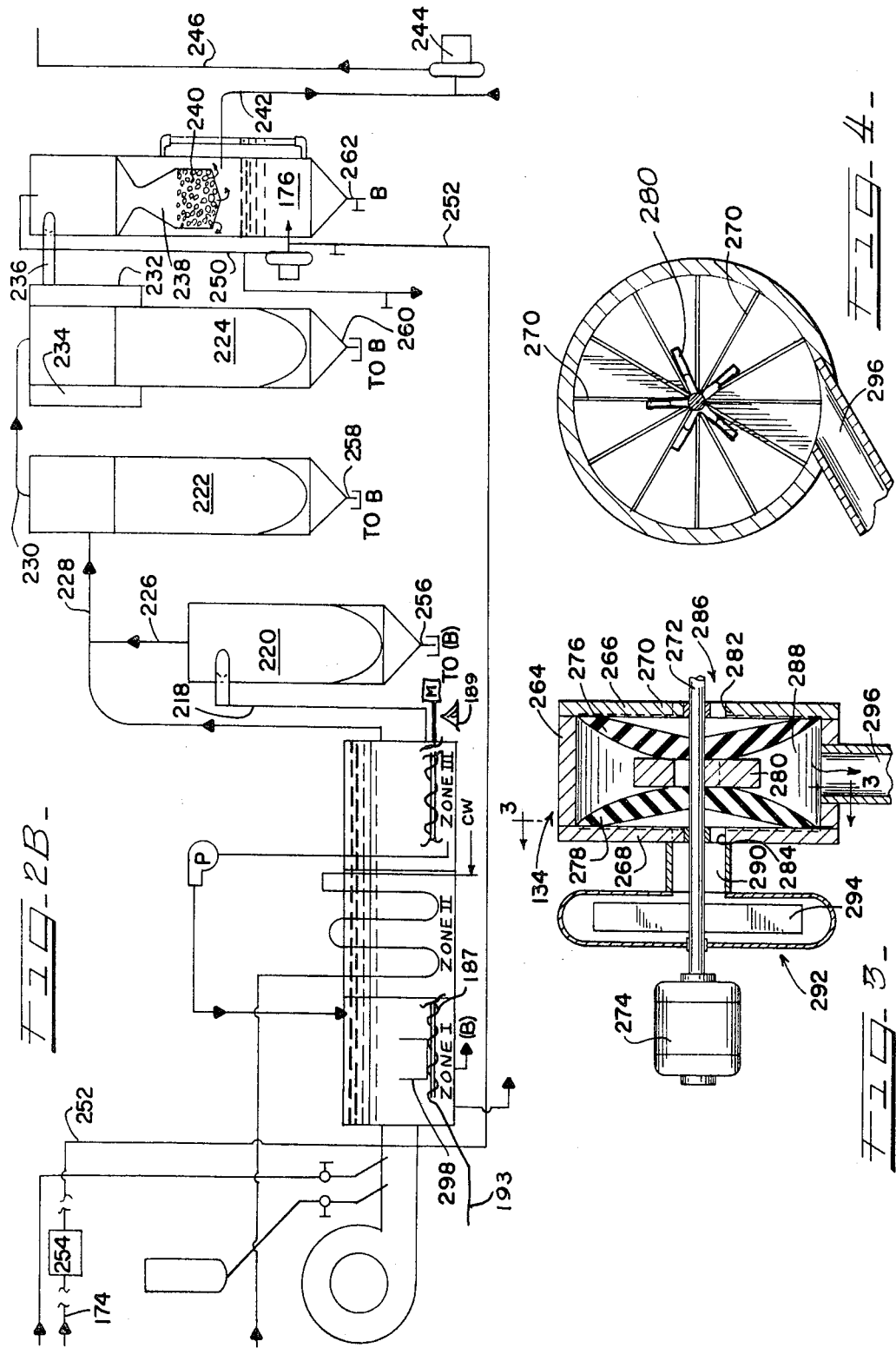

METAL RECOVERY METHOD

SUMMARY OF THE INVENTION

This is a continuation-in-part of application Ser. No. 132,061, filed Apr. 7, 1971, now U.S. Pat. No. 3,819,363 which is itself a continuation-in-part of application Ser. No. 49,455 filed June 24, 1970, now abandoned.

The present invention generally concerns metal recovery processes. Specifically, it concerns a system for recovering most metals, essentially quantitatively, from chemically composite ore materials, such as carbonaceous sea or land ore, native or synthetic. The present invention provides means for both assaying and for recovering base and precious metals associated chemically or physically with naturally occuring carbon, graphite and/or organic compounds and mixtures thereof or mixtures of compound inorganic ores which have been synthesized by adding carbon forms.

More specifically, the present invention provides a process for recovering metals from sea carbonaceous ores, which are black carbonaceous masses which have absorbed metal ions from seawater over a period of many years. These ions, by natural ion-exchange, electrolysis or solvent extraction (oil seepage) action, are reduced to fine elemental metal or metals chelated or otherwise bound either chemically to the carbonaceous masses or physically as organic metals and/or inorganic metal compounds also hosted by the carbonaceous mass or fraction.

Correspondingly, metals can be recovered from land carbonaceous ore, which generally comprises metamorphosized sea (relict) ore which has become graphitized into refractory consolidated black carbonaceous rock. The metals contained therein are similarly bound chemically, though partly graphitized and partly oxidized, and/or physically combined as submicroscopic metals, organometals or compounds in a metal-rich graphite-carbon matrix. In the case of land carbonaceous ore, the graphite hosts the still remaining noble metals, whereas the base metals have been largely oxidized and, in exposed regions, subsequently leached out. The noble metals in such oxidized, formerly carbonaceous ore are usually submicroscopic and in elemental or inorganic compound form. Gold and mercury can be easily removed from these oxidized ores by means of cyanide solution. However, these same metals in carbonaceous (unoxidized) fractions are refractory to cyanide and other conventional processes and can be removed quickly, economically and quantitatively only by use of the methods to be described and claimed herein.

Generally, the present invention is directed to a method of obtaining noble metal values from various types of ore. If carbonaceous ore is used, as would be the case with sea carbonaceous or land carbonaceous ore which has not become oxidized, an oxidizing agent is added. If the ore used is noncarbonaceous ore, a reducing agent such as carbon is added with the oxidizing agent to provide the components of an autogenous oxidation-reduction reaction. The mixture is heated to produce an autogenous combustion reaction between the oxidizing agent added and the reducing agent, preferably a form of carbon, which is already present in the ore.

If the reaction mixture is substantially stoichiometrically balanced, the reaction temperature will be above the transition temperature of the noble metals or their compounds and they will be driven into the vapor phase. They may then be recovered by fractional condensation, by the use of cyclones, scrubbers and electrostatic precipitators, followed by techniques well known to the industry.

If nonstoichiometrically balanced reaction mixtures are used, as in one of the embodiments of the present invention, the reaction temperature will not be sufficiently high to drive the noble metals and their compounds into the vapor phase, in which case such noble metals and their compounds may be recovered from the ash remaining after any carbon present was oxidized to carbon dioxide by techniques already known in the art.

Ignition of reaction mixtures may be accomplished by simple heating to a temperature sufficient to bring the mixture to autogenous spontaneous reaction or, alternatively, graphite may be added for electrical conductivity and the reaction mixture formed into electrodes in which case the reaction mixture is ignited by electric arc. The primary function here is to provide a temperature sufficient to begin the autogenous spontaneous combustion reaction. These heating methods are therefore considered to be alternative embodiments.

One embodiment of the present invention relates to an assay procedure necessary to assure that no carbonaceous host material remains in the sample to be assayed, since any graphite which contains noble metals, would slag out and would thus prevent the hosted metals from reporting in the assay. This assay procedure includes the burning of all carbon present, in whatever form, to carbon dioxide by adding perchloric acid to the sample and raising the temperature to at least 210°C, after which the temperature rises to much higher levels due to the reaction to completion between carbon and hot perchloric acid. This elevated temperature releases oxygen from the perchloric acid, completely consuming the refractory graphytic carbon or any other carbon that might otherwise have become graphytic during conventional fire assay procedures thus assuring that no hosted metals will be lost in the slag.

In order to save perchloric acid when the sample contains carbonates, hydrochloric acid is first used. After reaction, the spent hydrochloric acid is washed out and wasted together with the soluble salts produced, using a waterwash and filtration. Perchloric acid is then added to the washed pulp and the above procedure followed.

A second embodiment for recovering metals from sea carbonaceous ores which is intended primarily for production involves dredging, physical separation of sand and shell to produce a first rough float of carbonaceous fraction, refloating this fraction again with oil to obtain a gel-froth, after which the oil may be reclaimed by distillation and recycling. Chlorine, enzymes, electrolytically produced hypochlorite (in the pulp + seawater) and/or chemical hypochlorite may be added to strip most of the remaining fine sand and shell away from the then relatively pure carbonaceous sea ore concentrate. When chlorine alone has been used for stripping, the wet concentrate "float" is then mixed with hydroxide to bring the concentrate to neutral or basic pH. Next, stoichiometrically balanced oxygen-carrying chemicals and a wetting agent are added to the pulp solution and mixed. The chemically balanced pulp is dried, pulverized in impact mills and ignited in a vortex around a methane burner. This mixture burns at extremely high energy levels forming particulate plasma, thus volatilizing all metals contained into the vapor phase in a kiln or boiler, dropping the ash at the end of the kiln or through the grates of the boiler. Once ignited the natural gas flame can be turned to "pilot" or off and the particles continue to burn autogenously. The metals and metal compounds in the vapor phase, separate from the ash, are then condensed in approximate declining order of their transition temperatures in cyclones, scrubbers and finally electrostatic precipitation units. The substantially separate concentrates are approximately 50% metal by weight. These metals can then be recovered by simple conventional refining.

A third embodiment for recovering metals from land carbonaceous ores differs from the second in that conventional beneficiation methods are employed to provide a black carbonaceous concentrate. After preparation of this concentrate by crushing and flotation the two embodiments are essentially identical.

The second, third and fourth embodiments of the present invention can each use the particulate plasma method of driving metals into the vapor phase, mostly as compounds, as described in the second embodiment, supra. Also each of these embodiments can use arc volitalization. The concentrate-oxygen carrier mix is compounded with binder and graphite is added for conductivity. It is then molded, baked and placed in an arc circuit to release metal compounds or metals into the vapor phase through both arc and/or chemical energy.

The fourth embodiment concerns the synthesizing of carbonaceous ores from inorganic or oxidized, formerly carbonaceous ores, so that their metal content can be recovered by the methods described hereinabove in the second and third embodiments. The inorganic ore or oxidized formerly carbonaceous ore is processed much as land carbonaceous ore is processed, including the removal of magnetite after fracturing along mineralized boundaries of ore particles. Oversized particles are removed in hydro-cyclones and thickeners, leaving the high-grade fine particles. A small percentage of powdered coal is added to the fine particles (or graphite, if arc is to be the mode of volatilization used) to establish the minimum reducing agent content. Oxygen carrier is added in wet solution as provided in the second embodiment but in excess of stoichiometric balance with the reducing agent. The mix is then dried and high initial point hydrocarbon is added and mixed to now complete the stoichiometric balance. This mix can then be ignited by the particulate plasma mode or by arc volatilization. In practice, synthesizing can be avoided by merely blending the oxidized ore fines with carbonaceous ore concentrates. The heat developed by the reactive ingredients is sufficient to also volatilize sought metals as metals or compounds from the oxidized and, hence, inactive ingredients. Oxidized carbonaceous ore is generally found contiguous to and above carbonaceous ore, so this presents no problem. Typically, the top hundred feet of ore are usually oxidized and the lower hundred feet of ore body are usually carbonaceous.

By degrading beneficiation to a more dilute carbonaceous fraction concentrate, or by adding inorganic or oxidized carbonaceous concentrate to the high carbonaceous concentrate to achieve dilution, the ashing point can be lowered, say, to cut off at an iron oxide, $Fe_3O_4$, having a transition temperature (which is the temperature when the substance goes from liquid to gaseous or vapor phase) of 1538°C. Thereby, all metals and metal compounds having transition temperatures higher than 1538°C remain in the ash. Correspondingly, all other metals and metal compounds having lower transition temperatures are volatized into the vapor phase for recovery. If, for instance, uranium oxide ($U_3O_8$) having a transition temperature of 1300°C and metals and/or metal compounds with lower transition temperatures are sought, the carbonaceous concentrate is diluted to produce the mean energy level of combustion giving a particle temperature of 1300°C and thus retaining all $Fe_3O_4$ in the ash, together with all metals and metal compounds having transition temperatures higher than 1300°C.

In another embodiment, perchloric acid described in the first embodiment hereinabove, may be replaced by other oxygen carriers which may be produced electrolytically from the ore components plus salt and water. The present cost is about $1 per ton of raw carbonaceous ore input. Correspondingly, oxygen carriers may be compounded chemically from chlorine and hydroxide in hot concentrate pulp or solution for a present cost of $2 per input ton. Oxygen carriers, such as sodium chlorate which is the cheapest such carrier, may be utilized for a present cost of under $4 per input ton. The present cost of using perchloric acid or gases such as fluorine, chlorine, hydrogen, oxygen or ozone however is $36 per ton or more. Hence, even though perchloric acid as an oxygen carrier is particularly suited for burning carbon as graphite out of raw carbonaceous ore samples, it is not at present as economically suited for production as are other forms of oxygen carriers. Reaction gases even though trapped in foam bubbles, wet or dry, separately or combined, are difficult to balance with the ore solids.

In the first embodiment, when fuming perchloric acid reacts with raw carbonaceous ore, wherein the graphytic refractory carbonaceous particles are diluted with gangue, the oxygen is released by the oxygen carrier used, in this case, perchloric acid, along with hydrogen and chlorine at reaction temperatures above 203°C. The carbon, in any form, is completely burned to carbon dioxide, but contained metals do not go into the vapor phase either as metals or compounds. This is true since dilution by the gangue inherent in raw ore tends to reduce the energy released to below that required to volatize metals or their compounds into the vapor phase, but the energy is sufficient to completely burn any reducing agents in the reaction mixture. The excess oxygen and chlorine do nevertheless react with ore components, but their products are not generally volatile and remain in the ash. The hydrogen released may form volatile steam or reduce some of the metal compounds, again forming volatile steam or lower boiling point acids. It is evident that some of the energy produced here derives from the combustion of the released gases: chlorine with hydrogen, hydrogen with carbon from the ore; the latter producing methane which burns with released oxygen or ozone. This suggests the use of these gases per se to obtain energy for particulate plasma and to destroy the carbon forms. Also when a wet or dry foam is employed to contain the reactive gases, fluorine can be used as well.

The first embodiment (or the analogous gases) may therefore be ideal for removing graphite from raw carbonaceous ore samples prior to assaying so as to assure that the assay will give an accurate reporting of metals.

From one ton of raw carbonaceous ore about 50 pounds of concentrate may be derived. When fuming perchloric acid reacts with carbonaceous ore concentrate the reaction energy released is so high that not only is all of the graphite and carbon from hydrocarbons, carbon or graphite, which is chemically or physically combined with metals, burned to carbon dioxide, but the heat of reaction is sufficient to drive the noble and base metals sought into the vapor phase. These metals usually go into the vapor phase in the form of metal compounds, but at the highest energy levels elemental metals are produced in the vapor phase.

Pilot plant tests have shown that at the highest energy levels of particulate plasma using non-acid oxygen carriers, barium, calcium, silicon, aluminum and magnesium are among the high-refractory metal compounds in our ash. Most other metals will have gone into the vapor phase and therefore may be recovered from the vapor phase by fractional condensation and electrostatic precipitation.

Thus, the first embodiment appears most suited to preparation of raw ore samples for assay, wherein the metal values can be found in the ash. For other non-production purposes, such as academic research, it can be applied to carbonaceous ore concentrates, either natural or synthetic, whereby sufficient energy is developed within the particles, burning from the inside out to volatilize all metals or their compounds into the vapor phase. However, all of the other embodiments using oxygen carriers, less expensive than either perchloric acid or gases, are preferred for production.

Whether perchloric acid is used merely to burn graphite out of raw carbonaceous ore to assure that no metals are lost to the slag in fire assay, which is its preferred use, or it is used to drive contained metals into the vapor phase as metals or metal compounds from carbonaceous ore concentrate, combustion begins when the sample is still wet with acid. Such combustion is triggered by merely raising a portion of the sample above 203°C. Spontaneous combustion then continues until: (1) all of the organic, carbonaceous or graphytic fractions are burned; and/or (2) metals contained therein are volatilized to the vapor phase in some form. In none of the other embodiments is it necessary or beneficial for the pulp to go into autocombustion wet, since the flashing of water into steam unnecessarily uses up energy, reducing the net energy needed to produce particulate plasma and invariably lowering the threshold for transition to the vapor phase. This would limit both the range and quantity of metals or compounds driven into the vapor phase which can be recovered. In the latter case metal values are recovered from the ash.

Within these embodiments, additional combustible materials may be added to or burned with the composite materials. Alternatively, additional non-combustible materials such as inorganic ores or their concentrates or oxidized carbonaceous ore fractions or their concentrates may be added to the combustible mixtures to permit parasitic derivative vapor ignition of their metals or metal compounds from the excess energy of the combustible components.

In these embodiments, portions of the initial separation of the composite material is accomplished with the aid of surface active agents, or with ultrasonic energy, or both. In some instances, the composite materials are separated from one another by metal types prior to metal recovery. Examples are wet or dry removal of magnetite by magnetic separation, removal of copper, nickel and other metals by acid leaching prior to adding oil, coal, graphite or oxygen carriers to the concentrate throughout.

BACKGROUND OF THE INVENTION

Metal content in carbonaceous ores was first discovered by the inventor herein. By techniques of the first embodiment of the present invention, surface tablelands, alluvium and moraine samples of black carbonaceous ores from Idaho, Nevada and California were assayed, reporting respectively tangible, visible metals in the following amounts: (a) 18.2 ounces of gold per ton; (b) 8.35 ounces of gold per ton and 40.2 ounces of silver per ton; and (c) 32.7 ounces of gold per ton and 90 ounces of silver per ton. The latter samples were from black carbonaceous tailings from the days of the '49ers. Many zero and low value carbonaceous ores and vast areas of low-grade gold-containing carbonaceous ores in the Pacific Northwest were found; however, even these ores were richer in gold than the world's best ore from conventional inorganic ores. Exploitation awaits this low-cost, ecologically safe process. Thus, vast new resources in gold and most other metals may be recovered by means of the present invention. The probable location and extent of sea and land carbonaceous ores was determined throughout the world. Carbonaceous land ores are found in western Canada, the United States, South America, South Africa and Eastern Australia, all of which areas are near the impact edges of the respective dispersing continents, where shallow seas were drained as the continents rose to form plains and impacted to form mountains. Live sea ores are found in quantity in the Philippine estuaries and in Lake Maracaibo. Sea carbonaceous ores are also found in trace to large quantities in shallow estuaries within a band around the earth, approximately 40° latitude on either side of the equator.

All known processes for recovery from these ores have been tried. None were found to be adaptable to the recovery of metals from carbonaceous ores. Early in 1966 the inventor herein filed a United States patent application, the invention of which provided for the first time the quantitative recovery of metals from carbonaceous ores. This process, although it is now used commercially, was primarily an electrolytic leaching method, having a relatively long retention time for extraction. Retention time in the final phases of the invention hereof, however, is less than five seconds and has been found to recover all sought metals quantitatively.

The aforementioned slower electrolytic process was left with full power on. The electrolyte went from the hypochlorite level to the chlorate level of oxygen carrier production. Spontaneous combustion occurred, driving the metals in the carbonaceous ore concentrate into the vapor phase in the form of their compounds, mostly oxides, some sulphides, chlorides, etc. Because of variations in input composite ore make-up and the variations expected in output demands, on-line computer process control may be beneficial for commercial implementation of the present invention, if other than noble metals are to be recovered.

As previously indicated, chlorine, hydrogen, oxygen and ozone gases may be used. Ozone and fluorine, two oxidants stronger than oxygen carrying chemicals, have been tried in the present process, but have been less satisfactory than other oxidants, either because of economics or because no vessel could be found for containment of the reaction except in wet foam, suggesting that organic or inorganic dried foam may be used to contain those gases. Other oxidizing agents, such as hydrogen peroxide and oxygen and chlorine clathrates have been tried and it has been found that under present techniques they must be used wet. The principles used in the present invention combine the scientific disciplines of propellant design, ballistics and mining, which achieve a homogenous reaction of solids, liquids and gases in various combinations approaching that of two gases. In the particulate plasma process described herein, particles are burned "from the inside out", as contrasted with, for example, fluidized bed reactions where burning is "from the outside in". The particulate plasma process takes place invariably as an oxidizing rather than as a reducing reaction, producing net energy in a form easily converted to power, as well as producing much-needed metals. Accordingly, the energy by-product may be harnessed and used.

The particulate plasma process may be sandwiched between conventional beneficiation or flotation and smelting and conventional refining for land carbonaceous ores. Existing sulfide ore processing facilities, now being abandoned because of the cost of implementing the new ecology laws, can be rebuilt to process carbonaceous ores using the particulate plasma process or arc process as is herein disclosed, thereby also rendering these plants ecologically safe as well as salvageable. The value of the metals which may be recovered at relatively little cost will permit such mine sites to be restored.

A mixture was prepared of pure graphite and oxygen carrying chemicals, nitrates and others in wet solution plus a wetting agent to penetrate the graphite with oxygen carrier. Upon drying this intimate mixture and heating to above 400°C, the particles go into brilliant auto-combustion with sufficient energy released to drive all contained metals into the vapor phase as metals and/or metal compounds safely and efficiently. Graphite represents the extreme refractory condition of the reducing agent, i.e. the carbonaceous ore concentrate. One would not be likely to encounter anything quite so refractory as pure graphite in actual production.

The present invention relates to methods for mineral recovery, and in particular, to methods wherein precious and base metals are recovered from composite ores in underwater offshore deposits — principally organic silts and the like, and land carbonaceous ore deposits usually metamorphosized from these same types of sea ores over a period of several hundred million years. The values are recovered by separating the composite metal and organic materials which comprise these submarine carbonaceous silts from the sand and shells also present therein or their derivatives, the silicates, carbonates, etc. from equivalent land carbonaceous ore deposits. The material is frothed in an aqueous medium forming an organic gel from the organic composite materials by the addition of oil and/or surface active agents in flotation. Part of the water is then removed and substantially all of the oil and/or surfactants. Next the carbonaceous residues or float are strongly oxidized by one of the following methods:

1. In accordance with the first embodiment, a liquid oxidant may be used, such as perchloric acid trihydrate. The mixture is then heated to achieve spontaneous ignition and combustion of the composite material to eliminate the organic portion thereof and produce an ash comprised of noble and base metals and slags. The ash is then suitable for assay, preferably by fire assay.

2. A liquid oxidant may be used, such as perchloric acid dihydrate, again following the first embodiment. This permits spontaneous ignition of the necessarily high carbonaceous composite material used in this method to eliminate the organic portion thereof and to volatilize all noble and most base metals into the vapor phase and to produce an ash comprised chiefly of alkali and alkaline-earth metal oxides barren of nobel metals.

3. Since the first embodiment is used primarily to remove completely organic materials from a sample to be assayed and the second embodiment is unusable in conventional assay and is possibly too expensive for production, a solid oxidant in concentrated solution may be used, in accordance with the second, third and fourth embodiments, with wetting agents or with high pressure to assure penetration of the oxygen carrier into the porous carbonaceous particles. Excess oxidant is then removed. The intimate mixture is then dried and ignited, driving all sought metals into the vapor phase as metals and/or metal compounds. This is known as the "particulate plasma" method. The metal vapors are recovered from the vapor phase by fractional condensation and electrostatic precipitation, producing substantially separate metal and compound concentrates of approximately 50% metal by weight.

Further, the second, third and fourth embodiments lend themselves to the use of composite electrodes to provide an arc of electricity to drive metals into the vapor phase as metals and/or metal compounds, using both electrical and chemical action to ignite the mixture to provide continuing energy to vaporize the carbonaceous concentrate, natural or synthetic into the vapor phase. Condensation from the vapor phase is done as described hereinabove. The choice of energy to drive metals into the vapor phase may range from total arc energy to total chemical energy, except for ignition which is of course by electric arc in this mode. Economic and process considerations favor chemical energy. For ignition, arc power is initially at a high level. Thereafter, it need be sustained only at very low power, the continuing energy deriving largely from chemical reaction.

The same general results may be brought about by the substitution of certain variables which will be set forth in further detail herein. These include methods of separating the inorganic material from the composite material and the manner in which combustion or ignition of the composite material takes place.

Silt and other submarine deposits, as well as landlocked sedimentary carbonaceous deposits, include noble metal values, particularly gold, silver and platinum, since these metals do not go back into solution as readily as do more easily oxidized base metals, especially when such silts or deposits are from certain geographical regions.

Some techniques for evaluating the amount of precious and other metals present in carbonaceous ore have often, by their nature, either destroyed or masked the presence of such materials or rendered it difficult to determine accurately the amounts of such materials actually present. A prime reason is that graphitic formations occur which are refractory to melting and conventional processing. In other words the assaying techniques used have often either been based on the assumption that the precious metals were present in some particular form, which has not always been the case, or have been based on the assumption that such metals, if present, would undergo certain characteristic chemical reactions. However, it has been found that certain of these assumptions and theories have been fallacious, and, as a result, noble metals have escaped notice when the ore material in question has been analyzed with a view toward detecting the material, i.e., graphitized fractions slag out and do not burn or melt to provide metal. For instance also, atomic absorption or neutron activation assay techniques, the known standard techniques for determination of unknown content, are very unreliable or may not be used at all for this type of ore.

In other techniques, although the presence of gold or other valuable metals might be established, the methods suggested for use in recovering the metal were similar in concept, if not in execution, to the assay techniques used to determine the presence of the noble metals. Consequently, since a number of prior art processes of assaying were not economically feasible for commercial production, recovery of metal values, even of metal values known to be present, was not attempted, or, if attempted, was not successful commercially.

The present invention, on the other hand, is based in part upon the assumption that many precious metal values are extensively present in certain ores, including underwater silty organic residues and inland sedimentary deposits or carbonaceous land ores equal to relict carbonaceous sea ores. The metals, if not in actual chemically or physically precise forms of complex organic compounds, are at least present in such compounds and can therefore be recovered by an appropriate process, which have in large part escaped detection and/or recovery by techniques of the prior art.

These assumptions have been reinforced by exploration work throughout the world by the United States Bureau of Mines, by the United States Geological Survey and by assays made of these ores. Accordingly, in view of the general state of the prior art of precious metals recovery, and particularly in view of the drawbacks associated with prior art efforts to recover metal values from underwater deposits and other sedimentary deposits or their equivalent land deposits, it is an object of the present invention to provide an improved precious metal recovery method including the recovery of most base metals as well.

A further object is to provide a metal recovery method in which underwater deposits and their land counterparts are separated into noble metal-bearing components and waste components. Metal-bearing components are washed or treated with a water-immiscible organic cleaning-flotation agent in slightly acid solution to recover, almost completely all of the organic components as float.

Another object is to provide a method in which a metal-bearing composite material is recovered in a form suitable for subsequent treatment by formation into a gel-like material or float from which the carbonate content has been removed by chlorine or acid and thereafter by removing the water-immiscible, cleaning, flotation organic agent from the gel-like or float material.

Another object is to provide a method wherein a partially dried, metal containing composite material is treated solely with a strong oxidizing agent, or with a strong oxidizing agent where the carbonate content is not removed A still further object of the present invention is to provide a metal recovery method in which oxidized composite material having a noble metal component and an organic component is treated to remove excess oxidizing agent. Thereafter at an only moderately high temperature, the treated material spontaneously ignites and burns to form an ash containing recoverable noble metal compounds suitable for eventual recovery of metal therefrom.

Another object of the present invention is to provide a method for treating a floating constituent of an ore material with a water-immiscible, cleaning and floating agent in which the water supporting the composite material layer is slightly acidified, in which a significant portion of the solvent is recovered in a dryer, in which the remaining material is treated with a strong oxidizing agent, in which the excessive oxidizing agent is thereafter removed and in which the thus treated material spontaneously ignites and the residue, both coarse and fly-ash material, is collected for reduction to elemental metal form.

A further object is to provide a method in which only minimum quantities of reagents, such as cyanides and fluorides are used in which method the materials are economical and easy to obtain. Ozone ($O_3$) is not economical and/or workable to use in the dry state but may occur incidentally with other oxidizing agents used, always in atmospheric arc.

A still further object is to provide a method making use of flotation separation of metal containing composite materials from inorganic wastes, hydrocarbon treatment of these materials, and utilization of a dryer for recovering the hydrocarbon, a spraying unit or the like for oxidizing treatment of the composite material, and a dryer and ignition unit for recovering excess oxidizing agent and certain combustion products of the treated composite material, as well as a conveyor or the like for moving the material from one station to another and means for recovering the combustion products of the material for further treatment thereof.

A still further object of the present invention is to provide a method of concentrating valuable metal containing chemically composite materials prior to treatment thereof for recovery of the metal values therefrom.

Another object is to provide a method of concentrating the composite materials before processing thereof by means of successively treating the same in the presence of water with various detergent materials in a desired sequence, following which the composite material is floated and collected in a concentrated form for further treatment.

A still further object is the treatment of the composite material and the remainder of the ore with detergent materials in a predetermined sequence, while, at the same time, mechanically agitating the mixture to accelerate the rate of separation of inorganic materials from the composite material.

A further object is to provide a method of recovering metal values from chemically composite materials, which includes collecting the residues from the combustion of the composite organic materials, and separating the metal values from one another either by first separating the oxides, metals and compounds from one another or by reducing the oxides or other compounds as a group and subsequently separating the metals from one another following the reduction of the oxides and compounds to elemental metal form.

Another object is to provide a method of recovering valuable metals from composite materials which provides for the formation of composite materials adapted to undergo combustion under controlled oxidizing conditions, but which method utilizes a minimum proportion of expensive oxygen-bearing compounds.

Another object is to provide a method of recovering metal values, which includes preliminary separation of an organic or composite pulp from entrained or associated inorganic materials, by applying ultrasonic energy to a mixture of such organic, inorganic and composite materials and water.

Another object is to provide a method of recovering metal containing residues from combustion which includes treating a composite material with an oxidizing agent and a fuel material, and burning the composite material, the oxidizing agent and the additional fuel simultaneously in the presence of air under controlled conditions.

Another object is to provide a method wherein composite, noble metal containing materials may be treated by the addition thereto of combustible organic products, and wherein the composite materials and the added combustible products may be oxidized together, with a part of the oxygen for combustion being supplied from oxygen-bearing treating compounds and the remainder from the atmosphere in which combustion takes place.

Another object is to provide a method of controlling the combustion of noble metal containing composite materials so as to minimize or eliminate the production of refractory products and maximize the yield of reducible, unprotected metal, oxide and compound products resulting from controlled combustion of the composite materials.

A further object is to provide a method of burning together valuable metal containing composite materials and associated fuels, where necessary, so as to minimize the production of unoxidized, high temperature resistant materials created by the combination of unduly high localized combustion temperatures and insufficient oxidizable materials and/or oxidizing agents.

These objects, and other inherent objects and advantages of the invention are attained by separating the chemically composite materials from associated ore material, including inorganic components. When these inorganic components have high assay valves, they usually comprise inorganic ores or oxidized carbonaceous ores. They may be partly reconstituted with carbon, graphite or solid hydrocarbon, such as coal. This solid carbon or hydrocarbon is preferably added as fine powder before solid oxygen carrier is applied in solution with a wetting agent or pressure and then dried. Full reconstitution is accomplished by adding a high initial point hydrocarbon to the non-carbonaceous composite material in stoichiometric balance. The natural carbonaceous composite concentrate and the reconstituted or synthetic "carbonaceous" composite concentrate may be considered to be equal, singly or combined.

The composite concentrate may have added to it stoichiometric amounts of gaseous or liquid or solid oxygen carrier applied in solution with a wetting agent or under pressure. It is then dried and heated to ignition and autocombustion in a kiln or be electric arc if the composite concentrate plus oxygen carrier is further compounded with graphite and binder into electrodes. In either case, reducing fractions are consumed, releasing great energy as heat, thus driving contained metals into the vapor phase as metals and/or metal compounds. All reactions must be oxidizing rather than reducing during combustion into particulate plasma. If energy is not minimally sufficient to drive metals into the vapor phase as compounds, the reducing fractions of the composite concentrate are still consumed, but the metal values must then be recovered from the ash by fire assay procedures or by electric arc, furnace, or by other prior art refining technique. If the energy generated is sufficient to drive all sought metals into the vapor phase, the vapor alone will constitute the valuable output and the ash is barren of sought metals.

Metals and compounds are recovered from the vapor phase by fractional condensation in cyclones, scrubbers and electrostatic precipitators. Recovery is essentially by metals or metal groups with minimum overlap to be determined by the number of cyclones and scrubbers in series. These metals are suitable for subsequent collection or reduction to the metals which formed the metal constituent of aforesaid composite materials, natural or reconstituted.

The manner in which this invention achieves its objects and other inherent objects and advantages will become more clearly apparent when reference is made to the accompanying detailed description of the preferred embodiments of the invention, and to the drawings forming a part hereof, in which like reference numerals indicate corresponding parts throughout.

BRIEF DESCRIPTION OF THE DRAWINGS

FIG. 2B is a block diagram illustrating the remainder of the apparatus of FIG. 2A and shows other steps of the method therein illustrated;

FIG. 3 is a vertical sectional view of a form of transfer pump useful in performing one type of preliminary separation step used in the method of the invention;

FIG. 4 is a sectional view showing the pump of FIG. 3, taken along lines 4-4 thereof.

DESCRIPTION OF THE PREFERRED EMBODIMENTS

Figure 1A:
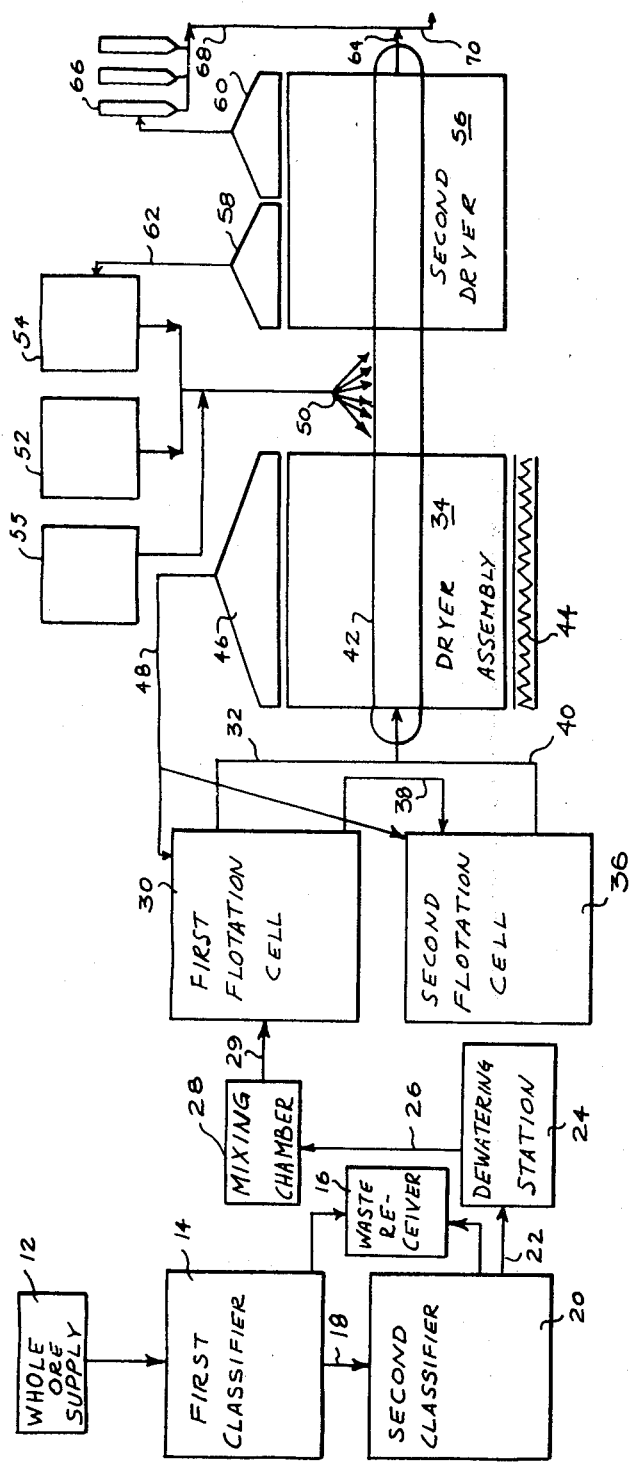
FIG. 1A is a block diagram showing a portion of an apparatus which may be used to practice one method of the present invention and illustrates certain steps of the method.

Before referring in detail to illustrative embodiments of the invention, it should be understood that, for reasons which will be set forth in greater detail herein, some of the terms used herein to designate the materials and methods are terms whose meanings are those defined herein and which will be understood from the context herein to refer more to the functional properties and aspects of the methods than to chemically precise definitions or characteristics of the materials or methods.

For example, the material from which the values are recovered is referred to generically as a "composite material", since its exact nature may not be known, because it may not be any particular material or mixture thereof, and because several otherwise different materials might, for purposes of the invention, be similar or the same although they may be quite different for other purposes. "Composite material" may be carbonaceous ore, reconstituted inorganic ore to react chemically as does carbonaceous ore, or the concentrates of these forms.

"Gaseous oxygen carriers" refers to oxygen, ozone, nitrous oxide and the like. "Wet or liquid oxygen carriers" refer to perchloric acid, nitric acid and the like. Dry solution or solid oxygen carriers refers to sodium chlorate or perchlorate, potassium nitrate, potassium permanganate and the like. Likewise, by way of example, certain treating materials may be referred to as solvents or the like, although their use in the method may not necessarily involve causing solution of other elements, as will more fully appear. It will likewise be understood that substitutions may be made for many if not all of the forms of apparatus described without sacrificing functions or result, as will be apparent to those skilled in the art. Certain examples of these substitutions will be referred to elsewhere herein.

Essentially, the present invention combines two disciplines, namely rocket ballistics and mining technology, a combination which is not often encountered in engineering development. It might be appropriate to define "particulate plasma" as we use the term herein. In the nuclear plasma state, the moleculs and atoms of ordinary matter, which are by nature electrically neutral, are broken down into more elementary particles — positively charged ions and negatively charged electrons. We have chosen the term particulate plasma to denote the breaking-up of mineral particles into the vapor phase of their metal compounds by the use of intermediate energy of chemical fulminization or electric arc, deriving substantially all of the energy from the oxygen carriers and the ore itself, i.e., the carbon in the form of graphite which is refractory to prior art processes and direct smelting.

The intermediate energy levels are sufficient to volatilize all but the alkali and the alkaline earth metal compounds into the vapor phase, thus affecting complete separation of the sought noble metal compounds, mostly oxides and chlorides, such as gold, from the lower base metals which emerge as barren ash with the alkali and alkaline earth metals in the ore having served with the $ClO_3$, $NO_3$ and other radicals to constitute electrolytically manufactured oxygen carriers.

With the use of chlorates, metal oxides and metal chlorides are produced in the vapor phase for those metals whose oxides and chlorides have transition temperatures resulting from intermediate energy fulminization of the oxygen carrier saturated reducing agent.

Synthetic carbonaceous ores are reconstituted by adding a solid fuel in powdered form including coal and/or graphite before oxidizing agent is added and a high initial flash point hydrocarbon, such as is derived from oil shale or tar sands following soluble oxygen carrier and wetting agent or pressure impregnation and drying with equal results on microscopic elemental or compound ores to complete the stoichiometric balance between reducing and oxidizing agents. The particles are ignited and burn spontaneously or are compressed into electrodes and arc fired to volatilize sought noble metals into the vapor phase.

The volatilized metal compounds are fractionally condensed in approximate declining order of their transition temperatures, affecting substantial separation of the metal compounds. Because gold chloride does not condense much above 100°C, it must in large measure be recovered by electrostatic precipitation. Water scrubbers recover roughly 20% of the gold, flu condensers another 20% and electrostatic precipitation the remaining 60%. The ash was found to be barren of sought noble metals.

A large amount of heat energy is produced in addition to important, noble metals. In the final reactions, the particulate plasma of the concentrates into the vapor phase could be accomplished by means of a powdered coal burning steam power generating plant, since the metal vapors are noncorrosive to boiler tubes. Also, these processes are ecologically safe.

Open electrolysis of the composite material in salt water solution will produce oxygen carriers autogenously, creating high chlorate chemistry, drying of the electrolyte and with arc heat producing spontaneous fulminization, i.e., combustion from within, of the oxygen carrier saturated carbonaceous particles which drives all contained metals into the vapor phase. Dry electric arc may be used to provide a sufficient ignition temperature to drive the stoichiometrically balanced particles into spontaneous fulminization, a form of rapid burning or particulate explosion termed particulate plasma. This process is safe, like a sparkler, because of dilution with inevitable silicous gangue which remains even after concentration. In this embodiment arc energy first produces sodium chlorate from the hypochlorite in a wet particle-seawater-electrolyte matrix and dry arc is then used to ignite the particles.

Reconstruction of the inputs, including carbonaceous concentrate, wetting agents, cleaning agents and saturated saltwater and subsequent open electrolysis and electrode spacing produced precisely the same results, except that fulminization was permitted to proceed to the quantitative volatilization of all contained metals and to a completely barren ash.

Wetting agents are augmented with animal enzymes, such as protein are used to assist the flotation-cleaning agents to separate carbonaceous material from gangue. Oxygen carrying chemicals may be purchased commercially to augment the chlorates produced with chlorine and caustic soda electrolytically. In the latter case, alkali and alkaline earth metal and lower base metal compounds from composite material and sea water were converted to chlorates in hot solution to comprise or augment the oxygen carrying chemicals or chemically supplied chlorine and hydroxide in hot solution.

Chemical oxygen in wet solution was chemically balanced with the carbonaceous concentrate. The chemical pulp was dried and pulverized in an impact mill. The dried pulp was blown into a kiln via a lazy cyclone and ignited with a natural gas flame in the kiln. The volatilized metal vapors were collected as metal oxides, chlorides, etc. A few metals were collected as elemental. Metal recovery was quantitative and the ash was barren of sought metals. Output metal compounds were then melted into ingots.

The first embodiment herein duplicates the above procedure only to the extent of destroying the graphytic, refractory carbonaceous fraction with fuming perchloric acid, so that the metals contained will report as tangible, weighable gold, silver, platinum, etc. out, for fire assay and electric furnace recovery, instead of being lost with graphite in the slag inasmuch as graphite floates and the hosted metals do not melt 'down' by prior art melting. This produces a fast, precise, quantitative, visible, tangible metal product out of any carbonaceous ore. Without destroying the carbonaceous fraction, it was found that most of the metal was lost to the slag and was only partly recovered by re-assaying the slag.

Consumable electrodes containing composite concentrate and carbon, in any one of several forms, including anaerobically heated coal to form synthetic graphite to provide additional conductivity may be used to smelt and partly refine raw ore concentrates into crude output metals and/or alloys comprising the metals contained in the composite concentrate. Higher electrical or chemical energy may be used to drive these metals into the vapor phase as metals or their compounds to be collected substantially separately in cyclones, scrubberss and/or electrostatic precipitators.

If the smelting mode is used at lower energy with minimum chemical energy, high erosion arc then may be used to purify the crude metal electrodes, with results about equal to zone melting. Subsequent refining by high erosion arc is not an element of the present invention.

As a prerequisite, the chemical pulp must contain sufficient carbon to conduct electricity. The pulp thus effectively shortens the net electrode spacing to go into arc to volatilize the conducting pulp "linkage". Volatilization may then result from the chemical arc energy of that pulp in the arc gap interface between electrodes once the pulp is raised to ignition temperature.

With deficient oxygen carrier ($ClO_3$, $NO_3$, etc.), an excess of autogenous carbon in the pulp permits striking a balance between chemical and arc energy (including ozone produced by arc) needed to volatilize metals into the vapor phase for sequential recovery by fractional condensation as metals and/or metal compounds in those regions where electrical power is more readily available and cheaper than are chemicals and natural gas.

Fulminizing, or high evergy combustible electrodes, are formed from natural or synthetic carbonaceous ore or carbonaceous ore concentrates to which oxygen carrying chemicals are added in wet solution together with wetting agents or pressure. This compounding provides intimate, near homogenous reactions between chemical oxygen and the organic components of the natural or synthetic carbonaceous minerals upon arc ignition, forming particulate plasma at the arc gap interface.

Sufficient supplementary carbon in its several forms is added to give conductivity and reducing agent supplements to low grade carbonaceous ores or concentrates.

Sufficient oxygen carrying chemicals are compounded to the natural, partly or totally synthetic carbonaceous ores or concentrates, augmented by ozone produced in atmospheric arc.

The limits of arc power to be supplied to reach volatilization of metals from the so compounded electrodes is dependent upon the amount of arc energy versus chemical energy used to affect volatilization.

The electrical support system is standard. The voltage, current, AC or DC power and AC power factor used depend upon electrode size, spacing and physical composition. The rate of electrode consumption will be exceedingly high at maximum arc power and/or maximum chemical power.

Referring now to FIG. 1A in greater detail, a portion 10A of the apparatus is shown to include means 12 for supplying whole ore and a first separator 14, preferably a vertical classifier, which receives ore input and diverts the sand and shells and some water to a waste receiver 16, directing the remaining portion of the input through a conduit 18 to a second classifier 20. In this connection, it will be understood that the invention herein is illustrated in relation to an embodiment wherein the noble metal values are contained in underwater, generally solid deposits lying on or forming the bottom of a body of water. Therefore, the terms "ore" or "whole ore" as applied to underwater materials are intended to encompass solid and semi-solid material as well as the water associated therewith. However, it is not necessary that the ore be of underwater origin. Therefore, unless otherwise indicated, the term "ore" when only generally used herein is intended to include both solid material as well as solid material mixed with water, and to include materials deposited on dry land (recent or relict) as well as those of submarine origin.

Example 1

Referring again to the vertical classifier or like separator 14, it will be assumed that whole ore is being delivered thereto, and that the shells and sand (or carbonates and silicates) therein are typically separated by velocity separation. The makeup of the effluent from the separator 14 ordinarily comprises about 10% solids. The second classifier 20 provides some additional separation of sand and shells from the whole ore material. In this case, however, additional water is provided to maintain the effluent at a solids content of about 10%. From the second classifier 20 the ore passes through conduit 22 to a dewatering station where the solids in the mixture are concentrated to a level of about 30%.

The resulting material, somewhat in the nature of a pulp, is then passed through conduit 26 to a mixing chamber 28 where, preferably with substantial agitation, a minor amount of hydrochloric acid is added, for example, three pounds per ton of dry solids, as hydrochloric acid or as dissolved chlorine. The principal reaction taking place as a result of this treatment is the formation of gaseous carbon dioxide and calcium chloride from whatever calcium carbonate is still present in the mixture. Conduit 29 then delivers the liquid material to a first flotation cell 30, which includes impellers of a known type, and a weir disposed along a substantial length of one edge portion in a manner well known in the art. In the first flotation cell 30, a low desity, substantially water immiscible, organic material is added, typically in the amount of one pound per ton of dry, solid material. In this particular example, benzene (boiling point 80.3°C) is used. The "float" or frothy pulp from the first flotation tank is collected from the weir and directed by way of conduit 32 to a dryer assembly 34, while the other or "sink" portion is delivered to a second flotation cell 36 via conduit 38. Sea water salts retained in the pulp serve chemically to produce "dryable" oxygen carriers for electrolysis, if electrolysis is to be used to produce oxygen carriers, or by reaction at process heat with perchloric and/or nitric acid to aid in providing heat energy in reaction with the carbonaceous pulp. Excess sea water salts are otherwise useful only if chlorates are to be produced electrolytically in solution or in pulp solution, which is economically preferable to purchasing or producing chemically such oxygen carrying chemicals as hydroxide plus chlorine in hot solution or hot pulp. Excess salt may also aid in producing some metal chlorides in the vapor phase, although this is unnecessary as chlorides and chlorine from combustion reactants are usually sufficient. On the other hand, excess salts act as anticatalysts in reducing the amount of energy or rate of energy released in fulminization and are therefore undesirable. However, if electrolysis is not used to produce oxygen carriers, salt is generally undesirable and should be removed by washing as in flotation under all other circumstances. The second cell 36 is constructed and arranged in the same manner as the first flotation cell, and the output thereof, after similar treatment with benzene, passes over the weir and is delivered by way of conduit 40 to the dryer assembly 34. In use, about 90% of the values are normally contained in the float from the first cell 30, and about 10% of the values only are recovered from the float of the second cell 36. From this, it is clear that one flotation cell only may be used, if desired, or that a more extensive extraction or separation can be performed using two more flotation cells, if believed to be desirable or necessary.

The principal action taking place in the flotation cells 30 and 36 is the sink or settling of the more dense portions of the mixture supplied thereto, whereas the principal action of the mixer is the thorough agitation of the acidified, water-including or whole ore. Therefore, the action of the flotation cell is principally that of settling rather than that of frothing. In this connection, it will be appreciated that in the present invention, the organic liquid or solvent cleaning-flotation agents serve to strip away shells, sand and other inorganic material bound to the float so that it may settle in the cells. This action is in contrast to some frothing or flotation techinques wherein the flotation results from the attraction of oils to the sulfur-containing or sulfide portions of the organic constituents. The benzen or other flotation and cleaning agent also provides an interfacial action resulting in an effect analogous to the foaming caused by a detergent, and thereby additionally helps keep the desired phases floating on the water, substantially free of inorganic matter. The frothy pulp material to be passed through the dryer unit 34 is deposited on the upper run of a conveyor 42, the conveyor preferably being a pan type unit in which the pans are made of a non-metallic material such as porcelain, glass, or a high temperature resistant relatively inert plastic material, such as teflon, a fluoro-chloro-hydrocarbon. The dryer unit itself includes a main housing 42, indirect heating means schematically shown at 44 and a hood 46 to which is attached a condensing line 48 adapted to recover and return the benzene or other hydrocarbon material to a reservoir (not shown) from which it may be recirculated to the two flotation cells 30, 36. The interior of the dryer 34 is maintained at a temperature sufficient to evaporate the benzene or other flotation-cleaning agent in large part and most of the water. Although a certain portion of water is removed from the pulp by this drying, a certain amount remains, including absorbed or chemically bound water. The pulp emerging from the dryer 34 therefore has a damp, absorptive texture.

Adjacent the exit of the dryer 34 a sprayhead 50 is provided to spray perchloric acid trihydrate from a perchloric acid trihydrate generator 52 or a perchloric acid trihydrate storage tank 54 onto the pulp disposed on the conveyor 42 and emerging from the dryer 34. This treatment is carried out using a fine sprayhead and preferably using perchloric acid trihydrate which is safer than pure, monohydrate or dihydrate perchloric acid. A nitric acid supply 55 is provided so that about 0.1% nitric acid may be mixed with the perchloric acid prior to the spraying thereof. Although the nitric acid is not strictly necessary, it produces incipient nitrates which act as oxygen carriers and, if chlorine is not used for stripping carbonaceous skins from the gangue, it also serves to acidify the pulp in flotation to aid in forming the float gel of carbonaceous concentrate. The fine spray of perchloric acid trihydrate is rate regulated according to the amount and content of pulp present, with a slight excess of acid being used to insure complete oxidation of all oxidizable organic materials present.

After the perchloric acid treatment, the pulp material is introduced into a second dryer 56 which includes heating means (not shown) for the pans on the conveyor 42, a first hood 58 for acid recovery, and a second hood 60 for dust collecting, disposed downstream of the first hood 58. Preferably, the second dryer 56 is maintained at a temperature of about 210°C, which is sufficient to remove any unreacted perchlorate or its by-products, to remove water, and by auto-combustion to remove any other volatile constituent of the material being treated, including particularly graphitic and carbonaceous matter, which is oxidized to carbon dioxide. While the excess perchloric acid evaporates and is recovered through the conduit or line 62 to the storage area 54, the remaining heated and wet material is in spontaneous combustion starting at about 203°C. As the upper run of the conveyor proceeds to the outlet area 64 of the second dryer 56, the material completes its burning and loss of carbonaceous matter as carbon dioxide and may be recovered. In this connection, it is preferred that the material be so arranged on the conveyor, and the conveyor operated at a speed such that the progress of the flame front in a direction opposite that of conveyor pan movement is just offset by the rate of forward conveyor pan movement. In this manner, the burning is localized beneath the hood 60. Wet perchloric acid or chlorats and/or other oxygen carriers are supplied in solution with wetting agents or pressure, are dried and ignited to burn particles from the inside out, destroying all organics. Baking, flame drying or burning without an associated oxidizing agent would burn some of the carbonaceous fraction to carbon dioxide, and, in the case of hydrocarbons, to carbon dioxide and water, but, as tests have shown, much of it would convert to graphite, rendering it refractory to further burning and thereby rendering the metals contained in the so-produced graphite refractory to recovery except by methods of the present invention.

When carbonaceous pulp is super heated during electrolysis, the relatively cheap oxygen carrier, sodium chlorate, as well as perchloric acid is autogenously produced. Sodium chlorate plus other electrolytically produced oxygen carriers using carbonaceous pulp as the reducing agent, ignites into particulate plasma, not only burning the carbonaceous fraction to carbon dioxide and water as above, but also volatilizing all sought noble metals into the vapor phase as metals and/or metal compounds by means of chemical and/or arc and/or combination of both of these energy sources. Whereas wet oxygen carrier, fuming perchloric acid fulminization left the metal values in the ash, dry oxygen carriers, chlorates, etc. volatilized the metal values sought into the vapor phase. In each case metal values are recovered from the respective plasma-concentrated output media: solid, ash (using perchloric acid) or condensed vapor (using dry chlorate), by prior art refining.

Using perchloric acid, the character of burning of this oxidized composite residue is such that a significant amount of flyash is created and this ash is recoverd in a bag house schematically represented at 66, whereas the nonmetallic gaseous combustion products such as $H_2O$, $CO_2$, etc. are not recovered. The burning temperature itself is in the region of 2000°C, and the flame is an intense white flame similar to that seen in thermite reaction or in a magnesium flame.

A conduit 68 is provided to collect and return the dust from the bag house 66 to a collection area schematically shown at 70, where the residual solid, dust, powdered or fused material is dumped from the pan conveyor 42, so that all non-volatile combustion products coming from the second dryer 56 are collected substantially in their entirety. The residue is comprised of noble elemental metals, metal oxides and salts, base metal oxides and slag material including oxides and silicates of, manganese, magnesium, aluminum, uranium, etc., which act as fluxes for later smelting.

Figure 1B:
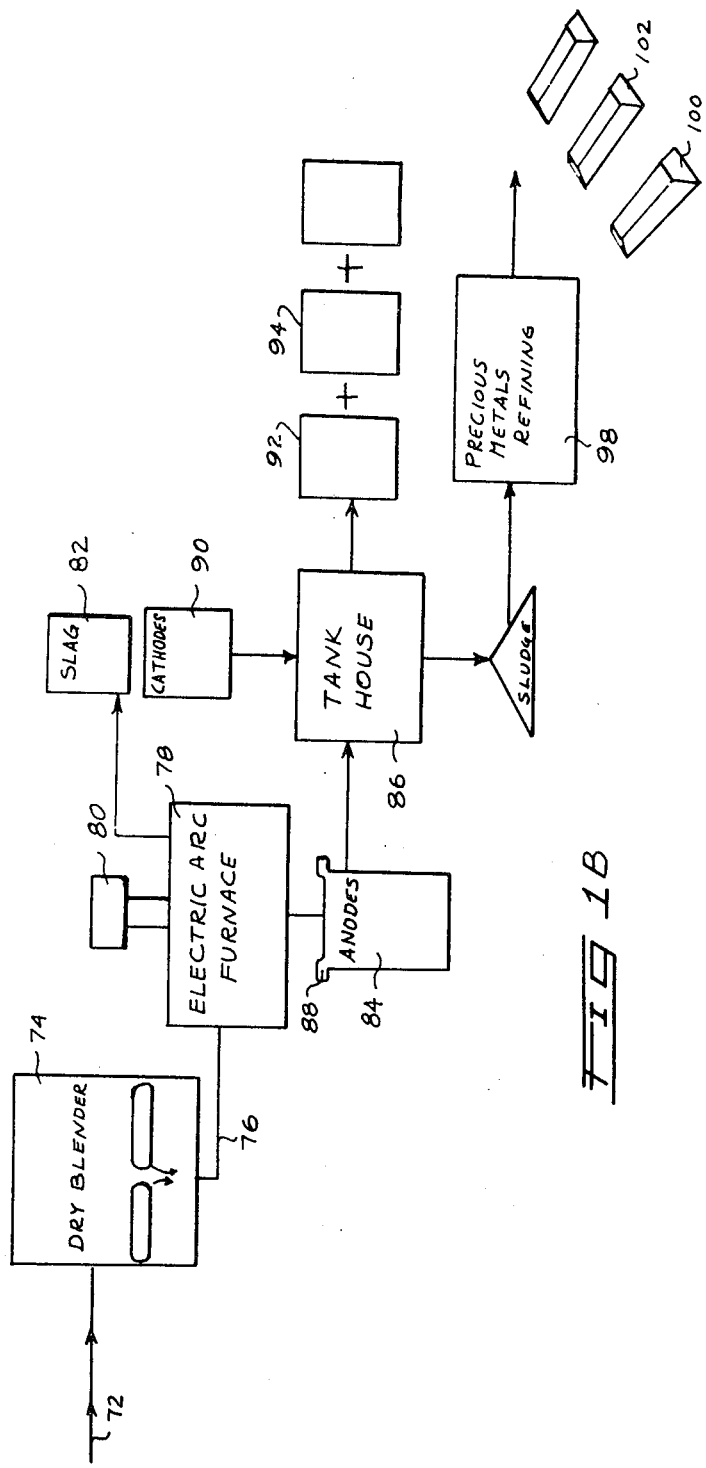
FIG. 1B is a block diagram illustrating the remainder of the apparatus which may be used to carry out this particular method of the present invention and shows other steps of the method described.

Referring now to FIG. 1B, another portion of the apparatus 10B is shown to include a conduit 72 for directing the slag and noble metals, metal oxides and salts emerging from the second dryer 56 to a dry blender 77 where a reducing agent, for example, powdered coal, is provided so as to furnish, as an example, 6½% fixed carbon in relation to the weight of noble and base metal oxides and salts in the ash which comprises the slag and metal oxides. In this connection, it will be realized that, depending on the proportions to each other of each of the noble and other metals present, and depending upon the percentage of metal oxides in the ash as a whole, the actual amount of carbon required for reduction will vary. With another typical sample ore comprising underwater silts and the like, the mix of gold, silver, platinum, palladium etc. was such that about 11½% of the metal oxides by weight was oxygen with the remainder being metal. Therefore, 11% active reducing agent is sufficient to consume or displace the oxygen present for permitting elemental metal recovery.

After thorough mixing of reducing agent and ash material in the dryer blender 74 and then briquetting in a manner well known to those skilled in the art, the ash and reducing agent "bricks" are passed through a conduit 76 to an electric arc furnace 78 from which the elemental metal is recovered, normally in the form of cast anodes suitable for subsequent refining. An incidental, advantageous effect of the inclusion in the arc furnace mix of the slag is that it serves as a protective flux for the material in the furnace and facilitates maintenance of the electric arc which is necessary to melt the mix to recover the elemental metal material. As will be understood by reference to FIG. 1B, the arc furnace is supplied from a conventional power source, diagrammatically shown at 80, and a stock pile 82 is provided for storage of excess slag which is continuously removed from the arc furnace once it is in operation. If desired, the slag may be further processed for recovery of metal values therefrom. Such slag, as pointed out above, commonly comprises silicates of aluminum, magnesium and manganese, rare earth metals and uranium.

The metal recovered from the arc furnace may be cast in the form of thin sheets 84 to be used as anodes in a tank house 86 of a well known type, and for this purpose, handling ears 88 may be cast thereon. The materials comprising the anodes are principally gold, silver, platinum and palladium, but alo may include such base metals as copper, zinc and uranium or iron.

The operation of the tank house includes a bath of the desired type for passing current from the so-called cathode starting sheets 90 to the anode sheets 84, the sheets being passed through the solution in sequence in a facing relation to adjacently disposed cathodes, with current passing therebetween through the solution to purify a given metal on the cathodes and ionize other metals for passage into solution, either to be plated out at another cathode or to be collected as an elemental metal sludge at the bottom of the tank. The product from the tank house includes cathodes 92, 94, etc. of relatively pure, easily plated out material such as copper. The sludge 96 collected from the solution comprises the precious metals which, having been separated from the anodes in which they were cast, may be treated in a precious metal refinery 98, the output of which is schematically illustrated as bars 100, 102, etc of gold, platinum, palladium and silver, for example.

Example 2

A process substantially as described in Example 1 was carried out, except that, instead of the benzene being used to treat the material floating on cells 30, 36 and resulting from the slight acidification of the frothed or aerated, 30% solids mixture, methyl isobutyl ketone ("MIBK") was used. This material worked with approximately equal effect in relation to the benzene used in Example 1, and was recovered in the same way. The process was otherwise carried out in the same way. MIBK is more expensive, however, than benzene, but it performs its cleaning and separating function well and is easy to recover.

Example 3

The process was also carried out without the addition of the trace amounts of nitric acids which were used in Example 1 for treatment at the same time the perchloric acid is sprayed onto the composite solvent treated material emerging from the first dryer 34. Although it is believed that the rate of oxidation may have been somewhat adversely affected by the absence of the nitric acid, the perchloric acid trihydrate treatment step is nevertheless effective alone to produce a material which is suitable for perchloric recovery and spontaneous ignition in the second drying oven.

Example 4

The process of the invention may be carried out as in any one of Examples 1–3, differing therefrom only in that a single flotation cell 30 is used to separate the float emerging from the mixer from the sink portion after treatment of the float with the water immiscible, organic material such as the benzene, the MIBK, or their equivalents. Use of this method may result in a somewhat decreased yield, but a principal portion of the values may nevertheless be recovered using the single flotation cell 30 only.

Example 5

A metal recovery operation may be carried out as set forth in any of the foregoing examples, except that, when the dust collected from the bag and the powder or other like material emerging from the second dryer are combined prior to being added to the electric arc furnace, another carbonaceous material, such as a petroleum coke or weed flour, shredded paper, etc. may be used as a partial or complete substitute for the powdered coal referred to in Example 1. Calculations of the desired amount are made on the basis of the amount of carbon which will be necessary in view of the amount of oxygen present in the metal oxide portion of the metal-containing mixture and the relative proportion of each metal oxide in the mix, all as set forth in the discussion of the method of Example 1.

Example 6

The process may be carried out using another generally water-immiscible organic material, such as, in this case, a petroleum naptha. The results obtained will also be satisfactory by using this material as a complete substitute, or as a partial substitute, for the benzene or ketone cleaning and flotation materials referred to in the above examples.

Example 7

The process may be carried out using another solvent of the water-immiscible, low density type such as gasoline, which may be substituted wholly or in part for the benzene or other solvent referred to in any of the above examples, without substantial loss of effectiveness.

Example 8

An operation was carried out as in any of the above example, except that, in the first drying operation, a vacuum dryer using low temperature evaporation was used in place of the ordinary drying oven 34. The results were approximately the same as the results of the other processes described herein.

Example 9

Various operations were carried out as in any of the foregoing examples, however, the oxidizing agents used, instead of the perchloric acid, were any of the following in suitable form, used as set forth herein and in a manner well known to those skilled in the art.

Ozone, sodium or calcium hypochlorite, various permanganates, other perchlorates, chlorates and oxygen, other gases-solids, liquids-solids and solids-solids particulate plasma technology. Although all of these materials may be made to operate, and is an excellent oxidizing agent, the perchloric acid is preferred where metal values are to be recovered from the ash rather than from the vapor phase, since it combines the advantages of reasonable cost, stability, lack of corrosiveness when properly used, freedom from toxicity, ease of handling and other considerations, including the ability to be used in aqueous solution.

Example 10

A process having certain steps in common with the process described in the foregoing Examples 1 through 9 inclusive, but also having certain different and additional steps, was carried out. This process will be described in connection with a description of the apparatus used to perform the process. The apparatus used also differed in some respects from that shown in FIGS. 1A and 1B, but was similar thereto in other respects.

Figure 2A:
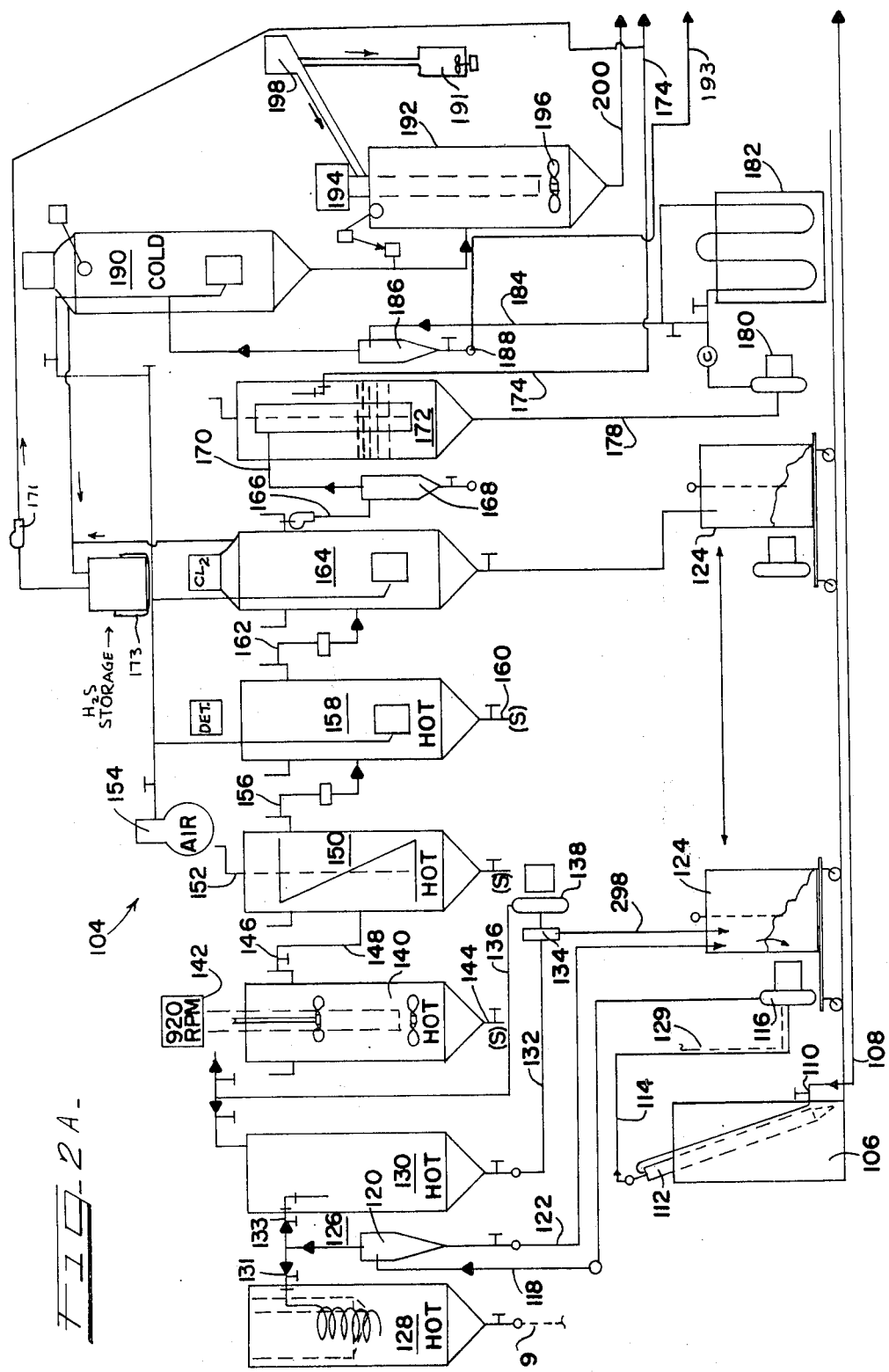
FIG. 2A is a block diagram showing a portion of another form of apparatus which may be used to practice another method of the present invention and illustrates certain steps of that method.

Referring now to FIGS. 2A and 2B, this apparatus is designated 104A and is illustrated somewhat schematically. As in the above examples, the method was directed to recovering metal values from sedimentary material such as submarine carbonaceous silts or the like. For purposes of illustration, it will be assumed that the whole ore, containing more or less water, but typically of about 70% solids concentration by weight, is disposed in a supply drum 106 served by a hot water line 108, flow through which is controlled by a valve 110. Water admitted by opening valve 110 passes through sleeve 112 with ore being thereby removed through line 114 from the drum 106 and supplied to the pump 116, from which it moves through line 118 to a hydrocyclone 120 where a preliminary separation of inorganic material and organic material takes place. Drain line 122 directs sand, shells and the like to a partitioned storage bin 124, while line 126 directs the float or froth of organic material, composite material and a certain amount of entrained inorganic material to either a washing tank 128 or to a mixing tank 130. Line 129, shown in phantom, is provided for recirculation through pump 116. Manipulating valves 131, 133 permits control of these steps.

Assuming that the material exceeds a desired solids concentration, such as more than 60%, it is elutriated in tank 128 to a 45% or less solids content using hot sea water, preferably water kept at about 80°C. Thereupon, the material is transferred to mixing tank 130, which is preferably maintained at about 80° to 90°C., wherein a preliminary separation of fats, carbohydrates and proteins from the sand is carried out by partial digestion of the organic material with amylase or a similar enzyme in the amount of about ½ pound per ton of dry solids. This cleaned, inorganic material is relatively coarse and may be collected and removed on a 0.1 mesh screen and thereafter discarded.

Next a 50%—50% mixture by weight of an anionic detergent and a non-ionic detergent are added to the mixture in the same tank 130 in the ratio of one pound of mixed detergent per ton of dry solids to assist in cleaning the sand and shells and separating them from the organometalliic constituents of the material. In this sense, the expression "organometallic" is used in its broadest sense to include any organic compound having precious metals associated or combined therewith in any way, and is not limited to meaning compositions with a coordinate or covalent carbon-to-metal bond. A complete separation is assisted by passage of this material through the line 132 to a separator 134 shown in detail in FIGS. 3 and 4, the operation of which will be described in greater detail herein. For the present, it will be assumed that the mechanical action of the separator 134 is sufficient to eliminate a certain proportion of sand, shells and the like from the composite material by mechanical scrubbing or cleaning action.

In tank 130, a modifier may be used to clean organic material from the surfaces of the inorganic particles. This etching modifier may consist of ½ pound of hydrochloric acid (HCl) and ¼ pound of hydrofluoric acid (HF) per dry ton of solids. In place of these acids, a similar amount of ammonium chloride ($NH_4Cl$) may be used in place of the HCl and/or HCl—HF. Line 136 delivers the output from a backup centrifugal pump 138 either back to the mixing tank 130 for repetition of the above described cycle or directs it to the blender tank 140, which includes a blender unit 142 and which is supplied with hot water, for example, sea water at 80°C.

In the blender tank 140, ¼ pound of glycerine per ton of dry solids is added to the mixture and the drain valve 144 is used to remove any sand and shells accumulating at the bottom thereof. From the blender tank 140, the top layers of material pass through valve 146 and through line 148 to a slow speed classifier 150 which is equipped with line 152 for supplying air from a source 154. Classifier 150 operates on known principles and serves to provide a further separation of sand and shells, removing all those entrapped on a 20 mesh screen.

Thereupon, the float is passed through line 156 into flotation tank 158, to which a detergent, with air, $O_2$, $O_3$, etc., performs a further separation with the organic and composite fines floating and the sand and shells sinking for eventual collection and removal from the bottom of the tank 158 through valve 160. Next, the material passes through line 162 to the oxidizer tank 164, which, like the preceding tanks, is kept between 70° and 80°C.

Oxidation is carried out in tank 164 by the addition of a suitable oxidizer, in this case, chlorine ($Cl_2$) until saturation at about 70°C is achieved. This causes near total cleaning of organics from inorganics and partial oxidation of the organic or composite metal-containing materials present.

The solubilities of the materials undergoing oxidative change are altered somewhat, and the oxidized organic materials other than those containing the metal values may either be precipitated out or rendered more soluble, with removal thereof being facilitated in either case.

After treatment in the oxidizing tank 164, the composite material is passed through line 166 into a second hydrocyclone or other separator 168 for removal of still finer mesh inorganic materials, including those which have passed through the 20 mesh screen. Following this step, the organic material is passed through line 170 into the flocculating tank 172 to which the flocculant and thickener are added, preferably in the ratio of ¼ pound each per dry ton of solids. Sodium aluminum sulfate or other alum or the like, or other known flocculant, suits this purpose, as does a commercially available flocculant such as "Dow MGL", a product of Dow Chemical Co., Midland, Michigan.

The liquid then decanted from the tank contains soluble products. This liquid is removed through line 174 to the scrubber tank 176 (FIG. 2B) for purposes to be described in further detail herein.

Line 178 removes flocculated material in the form of solids and pulp, directing them through pump 180, through an intercooler 182 and into line 184 for addition to the cyclone 186. The material continues through drain 188 for further removal of any then remaining sand, shells, or other inorganic material. Certain of these inorganic materials remain entrapped until after chlorination in spite of the various steps previously carried out for removal of the major portion of these inorganic materials.

By reference to the descriptions of the previously outlined steps of the process of this example, it will become apparent that a major function of these foregoing steps is to insure maximum separation of the organic or composite materials having the precious metal values therein from the inorganic materials associated therewith. This portion of the process is important since the organic material often exists only as a thin surface coating on the sand, shells, rutile, magnetite or other insoluble minerals and is sometimes trapped in the interstices of these or other inorganic materials. In any case, the separation must be effective for maximum yield, because the maximum quantity of starting material should be used and because the density per se of the organic material is considerably less than the density of the inorganic material having a coating of the organic or composite material thereon. The importance of this fact may be appreciated when it is understood that one primary process of material separation used in performing the process of the present invention is a gravity separation depending on differences in the densities of materials to be separated.

From the cyclone separator 186, the pulp material is directed through line 188 to the cold chlorinator 190, which is maintained at about 20°C and where additional chlorine is added to saturation. From this cold chlorinator 190 the chlorinated material is furnished to a precombustion mixing tank 192 which includes a motor 194 and an agitator 196 and wherein an oxygen carrier contained in storage means 198 is added to the pulp in a ratio of 30% of the dry pulp solids. The oxygen carrier or oxidizing agent is preferably potassium chlorate ($KClO_3$), potassium perchlorate ($KClO_4$), sodium chlorate ($NaClO_3$), sodium perchlorate ($NaClO_4$), potassium permanganate ($KMnO_4$) or the like. The composite material with its associated oxygen carrier or oxygen bearing product passes through line 200, for subsequent combustion, as will now be detailed.

Referring now to FIG. 2B, the remainder of the apparatus for carrying out the modified process of the invention is shown in diagrammatic form. FIG. 2B shows a fuel reservoir 202 and a feed line 204 and shows that both lines 200 and 204 are directed to a mixing area 206 which is served by a combustion air blower 208. Within an elongated combustion chamber 210 and downstream of the mixing area 206 are three combustion zones, each diagrammatically identified in FIG. 2B. Incorporated therewith are screw kilns 187, or the like, for roasting the downflow 188 of cyclone 186 after 3% oxygen carrier has been added in blender 191 via conduit 193. Kiln residue 189 is comprised of fine silica sand.

Within the mixing area 206 are a conventional burner nozzle, and an air supply. Pipes 200 and 204 furnish the burner nozzle with a mixture of the combustion oxidized composite material which includes its associated oxygen carrier and an auxiliary fuel which may be selected from various grades of fuel oil and natural gas or mixtures thereof. In other words, a burner (not shown in detail) is disposed for receiving the organic material, its own associated oxygen in the form of the oxygen carrier material, an auxiliary or secondary fuel and a supply of $O_2$ or air for furnishing combustion oxygen.

In the event that the original ore material is difficult to oxidize, or is relatively low in fuel value, even when associated with its oxygen carrier, a relatively larger amount of secondary fuel is needed. In other cases, less additional fuel or no additional fuel is required, since significant fuel value is inherently available for the production of ash material rich in noble metal values in some embodiments of the present invention and for substantially total conversion of the organic portion of the composite material to gaseous or volatile materials. In the illustrated embodiment, for example, the fuel added may be in the form of about 3% oil and 8% natural gas, both by weight in relation to the total dry weight of solids in the composite or pulp material. In the form of apparatus shown in FIG. 2B, the combustion chamber 210 is disposed within a tank 212 which serves, among other things, as a heat exchange. Fresh water is fed from water supply 214 through coils 216 and into line 108. The other end of line 108 serves the supply drum 106 (FIG. 2A).

The combustion products emerging from the combustion chamber 210 are directed through conduits 216 and 218 to dry flyash recovery tanks 220, 222 and 224 and ultimately to the wet ash or scrubber tank 176 for metal value recovery in some embodiments of the present invention.

After leaving the combustion area, the heavier combustion products and those containing the larger sized particles of ash residue pass through line 218, from which they are directed into the first dry ash recovery tank 220, at a tangent thereto for assistance in separation. An upper outlet line 226 joins the conduit or shunt line 216 which contains the higher velocity portions of the stream and those having more finely dispersed flyash therein. Combustion products including both gases and solids entrained therein are thereafter directed successively to dry ash recovery tanks 222 and 224. The inlet 228 to tank 222 is disposed at a tangent thereto for inducing a vortex flow pattern in the tank 222. Line 230 connects tank 222 to a tank 224 and gases entering by way of line 230 flow into tank 224 and exit into plenum 232 which is in communication with tank 224 by way of a cylindrical filter 234. Filter 234 is preferably a fiberglass matting material and should be provided with a mechanical vibrator or shaker unit for producing a self-cleaning action, and to maximize dry ash recovery in tank 224.

Gases and fine elemental metals, oxides and salts then pass through line 236 into the scrubber tank wherein a porous bag 238 containing coarse rocks 240 is suspended, and from which the gases less particles are directed through vent line 242 by blower 244 and ultimately to the atmosphere through flue 246. Accordingly, the air is pushed in one portion of the apparatus by the blower 208, and velocity is maintained by the suction produced by blower 244.

In another form of apparatus, a second scrubber tank such as the tank 176 may be provided. The number of flyash recovery tanks, scrubber units, etc., actually provided depends on the size and location of the apparatus and upon other factors which are known to those skilled in the art and which do not form a necessary part of the invention per se.

The circulating pump 248 causes the scrubber solution, which is typically 50% HCl with minor portions of $HNO_3$, $H_2SO_4$ and HF from condensed gases to be sprayed over the rocks 240 for fines recovery. Line 250 provides for recirculation and makeup line 252 communicates with removal line 174 (FIG. 2A) since the effluent from the flocculating and dewatering tank 172 is used for acid makeup, schematically shown at 254. It will be noted that the flyash is recovered by removal thereof from the drains 256, 258, 260 and 262 of the respective dry ash recovery tanks 220, 222 and 224 and the wet ash scrubber tank or tanks 176. The dry ash provides a major portion of nickel, iron, palladium, copper and silver, while the scrubber or wet ash provides primarily gold and silver values for embodiments of the present invention where particulate plasma energy levels are not attained.

Referring now to the recovery of metal values from the ash in these non-particulate plasma embodiments, most noble metals are present as fine elemental particles. Certain metals are present in the ash as reducible oxides and others are present as oxides which cannot be reduced readily. Nevertheless, the entire output of all the dry ash recovery tanks 220, 222 and 224 is combined with the output of the scrubber(s) 176 and this ash is mixed with fixed carbon, such as coal, in a proportion such that 11% fixed carbon, based on the dry weight of the ash, is provided. This combined material (typically 70% ash, containing silica, copper, iron, zinc; to which is added 16% KCl (potash), 5% borox, 3.9% copper, 1% $Na_2S$ solution, 1% zinc and 4% carbon) is then thoroughly mixed and briquetted so as to be suited for melting and reduction in an arc furnace. The other salts and oxides and the like serve as the flux. Upon reduction and liquefaction of the heated mass, the slag layer is poured slowly into a dilute leaching solution to bring about fracturing or subdividing of the slag and incidental preheating of the leaching solution prior to evaporating the acids and concentrating the ions in the acid solution. The fractured slag is then preferably rod milled to about 100 mesh or finer particle size before complete or final leaching.

Following removal of the slag, the melted metal is tapped into molds and cooled. It may then be treated by prior art methods of refining and further individual metal value recovery. The principal metals recovered include silver, gold, platinum and copper, etc, the base metals having been reduced from their oxides to elemental form by the carbon in the arc furnace. Uranium oxides, including $UO_2$, $UO_3$ and $U_3O_8$ may be recovered by nitric acid leaching from the slag, the uranium oxides not being reducible as readily as the other metals under these conditions.

Other oxides, as well as uranium oxides, are present in the ionic form in the nitric acid leaching solution. These may be concentrated by acid evaporation and thereafter recovered by various methods which do not form a necessary part of the present invention; namely, electrolytic precipitation, or the use of ion exchange resins for cation recovery or extraction with solvents, such as the use of pure or mixed ketones, etc., or by the full evaporation of the acid.

Certain values were recovered from the slag itself. The remainder of the slag normally consists principally of salts and base metal oxides such as aluminum oxide ($Al_2O_3$), silica ($SiO_2$), and titanium dioxide ($TiO_2$), all of which are not reduced during reduction of the previously created metal oxides in the furnace.

Reference will later be made to the method of recovering metal oxides, such as the uranium oxides referred to above, and other metals from this slag.

Although the present invention is not intended to be limited to or to depend on any one theory of operation or any particular physical or chemical mechanism, it is believed to be significantly different from known prior art methods. Understanding may be facilitated by making certain assumptions and classifying or identifying some of the metals to be recovered as being adapted to undergo certain behavior when treated according to the general method of the present invention.

In addition to whatever gold may be present as relatively pure and relatively available metallic gold merely physically trapped in organic materials, there is believed to be present in the ores a large proportion of gold which is present as organometallic gold, i.e., gold which is bound directly to the carbon atoms of an organic compound. In addition, it is though that gold ions, including complex gold ions, may be ionically bound to carbon or to one or more functional groups of organic compounds. Furthermore, metallic and/or simple or complex ionic forms of gold may be held fixed in relation to one or more organic molecules by a chelating or analogous bonding action. Furthermore, it is even considered possible that gold in one or more of the above forms, although not usually considered to be bonded or associated with an organic compound may be absorbed chemically and/or physically, on portions of one or more organic molecules. Gold may even be physically entrapped in a molecule or closely associated group of molecules, such as might be the case in a gel or molecular sieve. Accordingly, gold of this type may be relatively inaccessible from the standpoint of ordinary physical handling. The relatively dense gold might form a portion of a large molecule having a relatively low overall or average density. Likewise, gold present in an organometallic form would possess different characteristics than free metallic gold or gold ions. Various complex ion forms of gold might not read as other forms of gold would.

Most of the above considerations set forth in regard to gold are at least partially applicable to other precious metals, some of which are relatively easy to place into ionic or complex form but relatively difficult to recover from such form.

Accordingly, gold and other metals and their compounds, when associated in any way with organic materials, may be referred to generically herein, and in the claims, as "metal containing, composite materials", or similar expressions.

The frothing step of Examples 1-9 provides an easy separation of the organic component of the ore, which contains the values sought.

The solvent treatment disposes of the organic layer of soluble organic material which is not sufficiently complex to hold significant quantities of metals. The solvent also separates the valuable organic materials from closely held inorganic matter such as sand, shells, carbonates and the like, particularly in fine particle sizes, and allows such matter to sink to the bottom of the flotation cells. In this respect, one preferred characteristic of the water immiscible organic component is that it have a known "dry cleaning" effect. In fact, common dry cleaning fluids have provided good results when used with the process of the invention. Since the organic solvent is largely recirculated in the apparatus of FIGS. 1A and 1B, and such solvent is not significantly miscible in water, any precious metal which is incidentally trapped therein e.g. by solvent action can be recovered by subsequent treatment.

The step comprising oxidation of the composite material, following recovery of the solvent, is believed to oxidize those "activated" or otherwise attractive carbon or other sites on the organic molecule. By changing them chemically, oxidation is believed to render these sites unattractive to, or unable to bond with gold, gold ions, gold complexes, certain metals, metal ions, metal complexes and unable to attract the metals by chelation, adsorbtion or other perhaps insufficiently or improperly understood phenomena.

Although, as pointed out above, these statements rest on certain assumptions, and are not to be taken as forming any part of or in any way limiting the invention, it appears possible that such mechanisms may be responsible for the success of the process of the invention.

In the process illustrated in Examples 1-9, the spontaneous ignition of the oxdized composite metal-containing material affords one advantage of the present invention, in that the materials emerging from the second dryer are presented in a dry powder form from which they may be recovered by a simple, straightforward process. Simple arc furnace reduction and purification may be used; cyanidation may be avioded, as may ion exchange, solvent extraction and the like. The present invention does not rely on the use of dangerous materials, such as sodium cyanide or the like. The reasons for the spontaneous ignition of the combustible oxidized composite materials referred to in Examples 1-9 are not fully understood, but it is thought that a by-product of oxidizing the organic material may be to create rearranged or new products, including metal compounds, which are combustible, either alone or in combination with the other products present, and/or with any residual oxidizing agent which may be present.

From the foregoing discussion of certain of the features of the process of Examples 1-9 and from a comparison therewith of certain steps of the process of Example 10, it can be seen that, broadly speaking, the process may be divided generally into a few principal steps. The first important step is the separation of the sand, shells and like inorganic material from the organic or so-called composite materials which include the precious metals, rare earths and other like values therein. This may generally be referred to as the separation process.

The second important step is the combustion preparation step, which includes the use of any one or more oxidizing agents, and which also includes the addition, where necessary, of a fuel material, with or without its own additional oxygen. The object of this step is to insure that, upon combustion, there will be adequate combustible material as well as adequate oxygen to insure complete combustion, more particularly, combustion of the type which is adapted to bring about the production of elemental metals and reducible oxides and salts of all the metals sought.

The next principal step is the combustion step, wherein the composite material, with or without the additional fuel, and with or without an additional oxygen supply, is burned under conditions adapted to bring about conversion of the organic portions of the burned material to volatile products which are permitted to escape, and to bring about production of metal oxides which are recovered as ash or as vaporized metals and metal compounds recovered as flue products in other embodiments hereof. Such production is preferably carried out simultaneously with the production of slag materials and both dry and wet separations should be made to insure maximum elemental metal, salts and slag recovery.

The last principal step is the reduction and/or separation of the oxides and metals, which is preferably carried out by reducing the oxides in the presence of a flux material, and thereafter separating the metals from each other prior to reduction thereof In some cases the dry ash may be processed apart from the wet or scrubber ash. In other cases all of the ash may be processed together.

Referring to the first principal process step, namely the separation of the organic from the inorganic materials, certain additional examples will be set forth wherein different materials and apparatus are used to accomplish this purpose. However, before describing various ways in which this process may be carried out, it will be understood that, in general, the process relies upon the affinity of portions of the organic products for an organic solvent, or for a portion of a detergent or surface active agent or the like. In some cases the separation takes place partially by physical abrasion.

The organic or composite materials are often present in the ore in the form of thin coatings on small bits of sand or shells, or for land ore, silicates and carbonates. Consequently, fine sand or other fine inorganic materials have the capacity to retain on their surfaces relatively large quantities of such adsorbed organic materials. Accordingly, this phase of the process may be generally thought of as one wherein the chemical or physical action involves removal of the organic components from substrates to which they may be attached, as well as a density separation and a separation based on the general tendency of the organic materials to be relatively more soluble in an organic, water immiscible phase than in the water itself. Since separations of this kind customarily depend also on the fact that the organic components are customarily of lighter density than water, particularly salt water, it is also helpful to reduce the overall density of the organic product by entraining therein certain amounts of gases or air, as by frothing or the like. In addition to the aforesaid chemical and physical separation, it is also possible to remove adsorbed layers of organic material from inorganic substrates by the application of ultrasonic energy, following in the case of land ore, fragmentation of black rock particles along mineralized boundaries.

Referring now to the oxidation steps, it will be understood that, in spite of the foregoing separation steps, the organic material will still contain a certain amount of inorganic materials, as will now be set forth. The "float" or organic-containing material is in the form of a pulpy semi-solid or pulp which may typically consist of about 2% metal oxides, most of these being insoluble in water but entrained or entrapped within the organic phase. Metal chlorides, other than silver chloride, are generally soluble and remain in solution and therefore comprise only a negligible portion of the pulp. About 3% of a typical pulp consists of metal chelates, where two or more carboxyl groups are typically present and serve to bond with metal in a well known manner. Typically, the organometallic materials, or those wherein the metal is directly bonded to the carbon, account for about 20% of the float pulp. These organometallic compounds are very numerous and varied, since a number of metals are present in various compounds and since the organic portion of any of the molecules may vary considerably. It is believed that some 500 to 800 such compounds may be present in typical ores.

The float pulp contains about 50% solids, about 47% is customarily water and about 3% various soluble salts, principally soldium chloride. About 25% by weight of the pulp is typically comprised of basic metal oxides, including aluminum oxide, silica, titanium dioxide and other less common oxides, including rare earths and their oxides.

In view of the foregoing, and particularly in view of the fact that the organic portions of the chelates and organometals may vary considerably with the source and composition of the ore, it is necessary that sufficient combustion of the desired type take place to fully volatilize all organic portions of the molecules, and to produce elemental metals, metal oxides and salts in a recoverable flyash form.

In accordance with one view of the present invention, it is necessary that sufficient oxygen be present when this combustion takes place to prevent the preliminary formation of excessive carbon or the like, particularly in the region of the metal, since it is believed that the formation of this material may impede or prevent oxidation of the metal as well as reduce heat transfer. For example, organometallic materials containing gold or the like, which have been subject to calcining or roasting in the presence of insufficient oxygen, often become "graphitized" or refractory. Metal components may not be recovered from such complexes, or, if able to be recovered, may be recovered only with great difficulty. Accordingly, it is necessary to insure that the correct amount of oxygen is present, rather than too much or too little. This is normally insured by providing an oxygen carrier which is added to the pulp prior to combustion thereof. The oxygen carrier is typically chlorate, perchlorate, or one of the other various oxidizing agents, including oxygen, halogens, ozone, etc. In addition to consideration of the particular oxidant used, consideration must also be given to the total fuel value of the oxidized product. In the United States, a number of oxidized products made from ore have a fuel value of about 4,000 to 6,000 BTU's per second, which may be typical and which produces good results. On the other hand, some ore might be more graphytic, and therefore, more oxygen must be added thereto. The chemical oxygen must saturate the composite material particle in oreder to obtain proper burning thereof, i.e., burning from the inside out, unless that is done, there may be no combustion at all of these factory ores. Both land and sea composite ore carbonaceous particles are highly porous and will absorb stoichiometric quantities of oxygen carriers if this amount of oxidizing agent is used.

Example 11

A process was carried out generally along the lines set forth in Example 10, differing therefrom only as follows: Instead of the amylase digestor and the detergents used in Example 10, about 1 pound of glycerine or 1 pound of "DOWFROTH 250" (Dow Chemical Company, Midland, Michigan) per ton of solids was used in the mixing tank 130, and about 1 to 5 pounds of hydrochloric acid per ton of dry pulp were added. This acid reacts with the calcium carbonate to produce $CO_2$ and thereby both removes the calcium carbonate from the water and provides needed calcium chloride. From about 1 to 5 pounds of fatty acid per dry ton of float or pulp were used in the flotation tank 158, with light petroleum distillates being used in the classifier 150. In other respects, the process carried out was the same or substantially the same as that of Example 10.

Example 12

A process similar to that carried out in Example 10 was used to produce the desired metal oxide values, except that, in the preliminary separation stage, after elutriation of the ore to the desired solids percentages, and after addition of hydrochloric acid to eliminate calcium carbonate and produce calcium chloride, the particles of sand, shells and the like were cleaned by the application thereto of ultrasonic energy while in water. This step was carried out in a tank (not shown) of known construction. As pointed out above, this method is suitable for mechanically removing organic residues from inorganic material. When separated in this manner, the organic product is suitable for further separation, as the classifier 150 and in the flotation tank 158, to which air is added to assist in forming a froth for separation. In this case, the separator 134, which will be described in detail herein, may be eliminated, since the mechanical action it affords is substantially the same as the mechanical agitation furnished by the ultrasonic energy source.

Example 13

A process was carried out substantially in the manner set forth in Example 10, except that, in addition to the chlorate, perchlorate or other so-called oxygen carrier or oxidizing agent added to tank 192, hydrofluoric acid (HF) was also added. The ordinary oxygen carrier was present in an amount of 10 pounds per ton of pulp (dry weight basis) and the HF was added in the amount of 10 pounds per ton or less. In such a case, in view of the strong oxidizing characteristics and potential explosion hazard of these materials, the tank 192 should be surrounded by a woven jacket of steel cables of a ⅛ inch diameter size. The results of this method were similar to the results obtained by using the methods described in the foregoing examples.

Example 14

A method similar to that set forth in Example 10 was carried out, except that the oxygen carrier was selected from a group of known oxidizing agents including potassium nitrate, sodium nitrate, hydrogen peroxide, nitric acid, nitric oxide, calcium chlorate, calcium nitrate, ammonium nitrate, oxygen and ozone. These materials were found to be useful in ranges of from about 1 or 2 lbs. per ton up to 30 or 40% of the dry weight of the ores, depending on the composition of the ores. These materials operate in various combinations as well as individually. The chlorates and perchlorates are generally preferred because of economy and ease of handling. A portion of thee economy of use thereof results from the fact that certain chlorates and perchlorates may be made by using chlorine and other by-products of the principal process.

Example 15

A method such as that described in Example 10 was carried out except that, following the dewatering of the composite material to a concentration of about 50% solids, chlorine is added at the rate of 5 lbs. per ton of dry solids. An important feature of this particular method is that the chlorine is added in the clathrate or inclusion complex form ($Cl_2 \cdot 7H_2O$, for example).

As is well known, the clathrate form is one wherein a normally gaseous material such as chlorine is held in association with an inter-intra-molecular lattice so that the gas may be handled as a liquid, even though, when reaction conditions are present, the chlorine or other gaseous material is chemically free to participate in the reaction. Such a form is produced by bubbling chlorine through a dilute calcium chloride solution which produces clathrate crystals which are stable for a long enough time to facilitate handling for purpsoes of the invention. In use, it is believed that the composition of these crystals probably varies between 7 parts of water for each mole of chlorine up to about 20 parts of water for each mole of chlorine.

Whether providing the chlorine in the inclusion complex form or otherwise, it is also possible to add some or all of the oxygen in this form, the oxygen being held or fixed by beta-quinol (p-dihydroxybenzene) or beta-quinol and urea. The beta-quinol, alone or with the urea, also forms a clathrate or inclusion complex for temporarily "holding" the oxygen for use in the process. In this connection, a typical pulp as treated in any of the foregoing examples, not specifically reciting a different proportion thereof should preferably use 11.4 pounds of oxygen per ton of pulp and 6.4 pounds of chlorine per ton of pulp.

As an alternative, or in cooperation with the foregoing described methods of supplying oxygen to the pulp for combination therewith to produce the combustible oxygen carrying composite material, pure oxygen may be bubbled through the precombustion mixing tank 192. In some cases it may be necessary to raise the pressure to about 4 atmospheres. In the event that the ores prove less reactive, or other conditions are present tending to reduce the rate or degree of reaction between the pulp and the oxygen, higher pressures may be required. One advantage of using the quinol or ureaquinol system is that the pressure requirement may be reduced or eliminated.

As a further alternative to previously described forms of oxygen addition, ozone may be provided for addition to the pulp at the mixing tank 192. Ozone is advantageous in that it is highly reactive, although it is known to be an expensive method of supplying oxygen.

When the oxidized pulp material is supplied to the burner along with the additional fuel material, it is preferred that the additional fuel be discharged, sprayed or atomized so as to surround the flame caused by ignition of the oxidized pulp and it is also preferred that this secondary fuel be supplied with a second source of oxygen, usually merely air from the atmosphere propelled by the blower 208. In this manner, the auxiliary fuel serves as an "envelope" around the primary flame and maintains a high temperature. The primary fuel is preferably forced through a nozzle at a high pressure so as to be atomized. The manner in which the secondary fuel is supplied to the combustion zones also depends at least to a certain extent on the nature of the fuel, i.e., whether it is oil, gas, or a mixture thereof.

Referring now to the combustion process, although the present invention is not intended to be limited to any particular theory of general operation or particular theory of combustion it is believed that combustion in the burner may occur somewhat along the lines set forth below.

Since chlorine will react with some organic materials to produce HCl and carbon monoxide in the presence of available carbon and oxygem, it is thought that chlorine and oxygen may react with oxygen-containing organometallic materials, such as oxidized organometallic gold material, to produce HCl, water vapor, carbon monoxide and an organometallic material having a reduced carbon chain length and chlorine replacing some or all of the oxygen. Furthermore, free chlorine and oxygen may react with organometals, such as gold or palladium to produce salts, oxides and volatile hydrocarbons and chlorinated hydrocarbons. Gold or other like metal values which may be present in chelated form, particularly in forms chelated by amine or acid groups, may react with chlorine and oxygen under these conditions to produce gold or like salts and oxides, nitric oxides, carbon monoxide and HCl and water vapors. Furthermore, the first combustion zone may involve certain other less important reactions including those involving sulfur, nitrogen and the like. Metals already oxidized, namely, alkaline earth metals or other base metal oxides, such as aluminum oxide, are fully oxidized and do not react, but are merely carried along or entrained in the combustion gas stream for separation as solids and for eventual use as slag materials in the ultimate metal recovery process.

In the middle or second zone of the flame, (FIG. 2B) it is possible that perchloric acid may be formed from the hydrochloric acid and the sodium perchlorate formed from sodium chlorate in the first flame zone.

In the last or third flame zone, most of the remaining organic material is believed to be converted to inorganic oxides or salts, with the remainder of the organic materials forming gases. Those metal atoms which were present in organometallic form are normally converted to oxides, salts, or elemental metals, while carbon is converted to carbon dioxide and hydrogen is converted to water vapor. Other reactions may include the reaction of some hydrogen with free chlorine or oxides to produce various chloric, chloride, sulfur, nitrogen and phosphorous acids which are vaporized and which may thereafter be recovered from the scrubbers. In this connection, it will be understood that, by reason of the natural occurrances of the ore materials, and the less than perfect separation of inorganic materials, minor amounts of sulfur, other halogens, phosphorous, etc are available for these side reactions.

To summarize certain aspects of all of the foregoing examples, it should be pointed out that a number of auxiliary systems would normally be present in the commercial forms of the apparatus described in detail herein. In particular, an apparatus of the type shown in FIGS. 2A and 2B would normally have associated therewith a number of heat exchangers, and/or refrigerators, and salt, acid and base makeup or mixing tanks, as well as the associated connections and fittings used therewith. Furthermore, such apparatus commonly includes a number of chemcial systems for recovering spent materials for reasons of economy. For example, some scrubber acid may be neutralized by ferrous hydroxide. $H_2S$ is produced in 164 and 190, collected and pumped to the scrubbers via pump 171 and pipes 174. $H_2S$ can also be stored in an activated charcoal chamber 173 and released upon heating. Other apparatus, such as water and treatment units, immersion heaters and so on are commonly present. However, a detailed description of these elements has been omitted, inasmuch as they are not strictly necessary to the practice of the invention and because those skilled in the art are familiar with such elements and their use.

Referring now to certain elements of the apparatus 104, one particular element which is helpful is the mechanical separator 134 shown in FIG. 3. This unit 134 includes a casing 264 having a pair of end walls 266 and 268, each of which includes a plurality of radial grooves 270 (FIG. 3). A rotating center shaft 272 is driven by a motor 274, and the shaft 272 includes first and second rubber or other flexible impeller elements 276 and 278, with a center impeller spacer 208 disposed therebetween. Inner margins 282 and 284, respectively of the end walls 266 and 268 define openings through which communication is established from an inlet area 286 to the interior 288 of the separator casing 264, and from the interior 288 to a pump inlet tube 290. The pump assembly 292 includes a rotary impeller 294 driven by the shaft 272. The interior 288 of the separator 134 communicates with a sump 296 in which sand and other dense particles may accumulate. In the use of the separator 134, actuation of the motor 274 causes the shaft 272 to rotate, and a centrifugal force is applied by the impellers 276 and 278 to the fluid trapped within the body. As the more dense particles tend to move radially outwardly of the housing 264, they are rolled or scrubbed by the rubber impellers 276, 278 along the faces of the end walls 266, 268, with the radial grooves 270 permitting inorganic particulate matter to escape therealong into the area of the sump 296. The less dense material proceeds generally axially of the separator 134, and through the outlet defined by the margins 284, inasmuch as a downstream low pressure area exists within the transfer pump 292. The larger, more dense, inorganic parts of the mixture transferred by the separtor 134 remain in the radially outer or sump portions of the pump unit, while the less dense, organic or organometallic compounds, salts water, etc., proceed through the inlet 290, to the pump 292 and thence back to the mixer tank 140 or the like As noted in FIG. 2A, the sump 296 may be connected through line 298 to the storage bin 124 which accumulates sand and shells for eventual discarding. As pointed out above, the provision of the rubber impellers 276 and 278 and the arrangement thereof so that the impellers rub against the faces of the end walls 266 and 268 provides a mechanical rolling and scrubbing action which is the equivalent of chemical or ultrasonic separation of the organic portions of the ore from the inorganic portions thereof. Accordingly, this form of separator is preferred where ultrasonic or protracted chemical separation is not feasible for one reason or another.

STOICHIOMETRICALLY BALANCED EMBODIMENTS

When in the foregoing examples stoichiometric proportions of the carbonaceous fuel fraction and the oxygen carriers are utilized, ignition of the stoichiometrically balanced particles (or stoichiometrically balanced electrodes if electric arc ignition is used) cause auto-combustion into particulate plasma, driving noble metals into the vapor phase as metals and/or meta compounds, leaving the barren ash devoid of these noble metals. The metals and/or metal compounds may be readily recovered from the vapor phase by fractional condensation.

Figure 5:
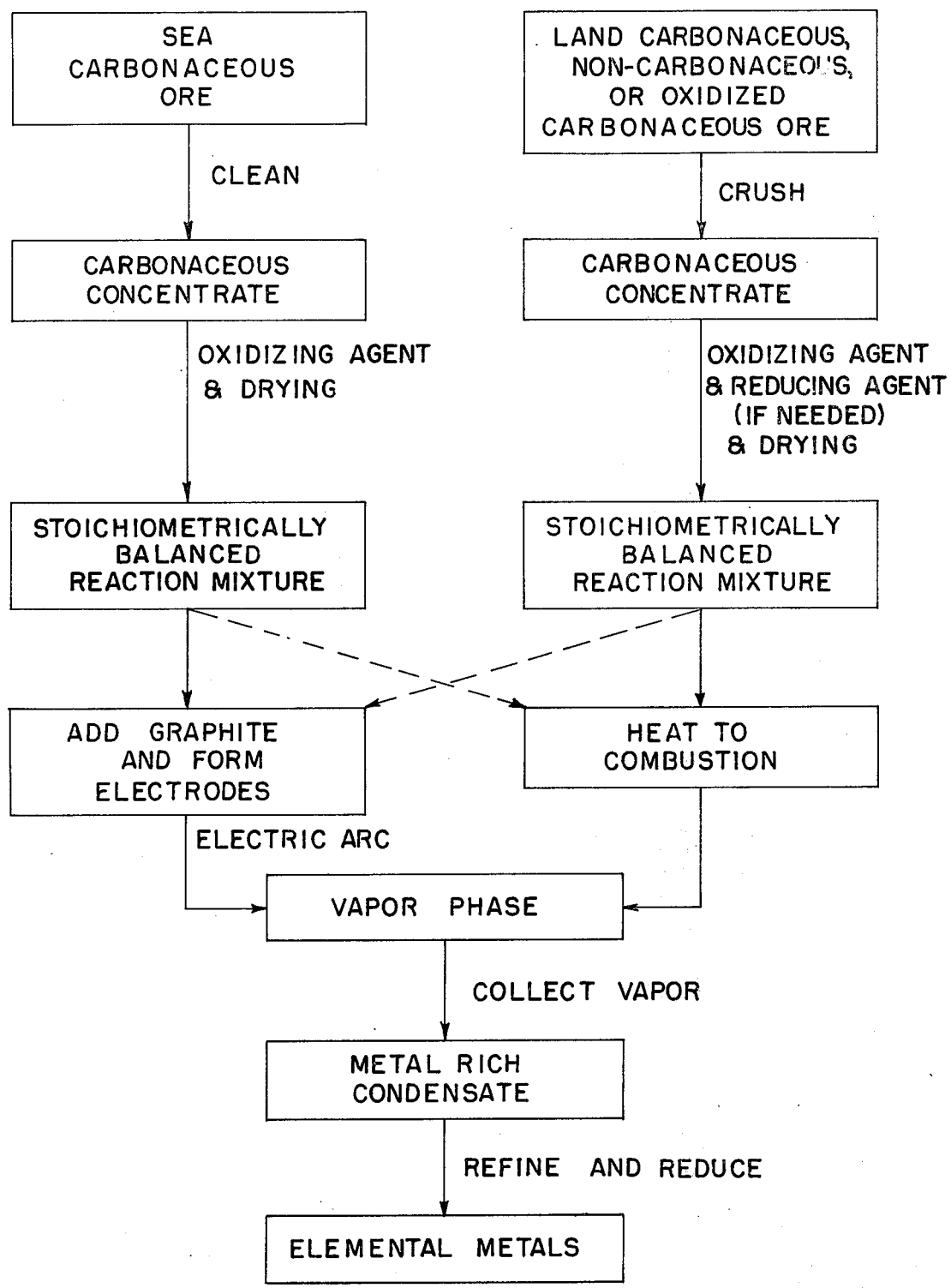
FIG. 5 is a flow chart illustrating the various steps of embodiments of the present invention wherein stoichiometrically balanced reaction mixtures are utilized, which result in recovery of noble metal values from the vapor phase.

The following examples represent the optimum methods for recovering all metals of value from carbonaceous, oxidized carbonaceous and/or some inorganic ores. The flow chart of FIG. 5 is meant to be illustrative of these stoichiometrically balanced embodiments of the present invention.

Example 17

Rough sea carbonaceous ore was first floated from the gangue, in sea water media, by velocity separation and gravity separation, using hydrocyclones, classifiers and thickeners, including mechanical strippers to loosen and strip carbonaceous coatings from gangue particles. Chlorine and air were added to the resulting, carbonaceous, rough first float. Full range enzymes were added to assist the further stripping action of chlorine in removing the carbonaceous material accluded to the gangue particles at a temperature of 80°C. The concentrated carbonaceous second float was olive-green to yellow at this stage. Oil, kerosene or benzene was added to the acid pulp in the proportion of 2 pounds of solvent to one ton of input on a dry basis. The gel float was easily separated from the stripped gangue, which was settled out as white, sink sand. The oil was not recovered, but most of it evaporated from the hot second float and later during the chemical preparation. Sodium hydroxide was added to reduce the pH from pH 1 to pH 7, producing $ClO_3^-$ in reaction with the chlorine remaining in solution after stripping.

The pulp at 30% solids was then fed into an open tank surrounding the kiln, in which multiple carbon electrodes were immersed and energized with alternating current superimposed upon direct current to produce oxygen carriers from pulp chemicals by electrolysis.

The pulp electrolyte was fed continuously and maintained at a temperature of 100°C during vigorous boiling. In this second float, sodium, potassium, calcium salts and other salts from the solids and sea water were converted by electrolysis into soluble chlorates. This mixture was added to the oxygen carriers just produced by chlorine and hydroxide in hot solution. After electrolysis, the pulp was just short of stoichiometric balance between the chemical oxygen in the carrier and the carbonaceous fraction in the float concentrate of pulp.

The pulp was then drained of chlorate-rich liquid to a 50% solids density. The drained liquid was recycled back into the float just after the pH of the float pulp had been raised to 7 by adding hydroxide.

The 50% solids concentrated pulp was topped with granular sodium chlorate to equal stoichiometric balance with the carbonaceous fraction of the pulp.

The chemically balanced pulp was then dried, pulverized in impact mills and fed into a twenty foot long brick lined kiln by a lazy cyclone in a vortex around a natural gas and air flame.

The particles ignited in blue-white flames and satellite flashes as the metals volatilized into particulate plasma with the metals going into the vapor phase as metal compounds and/or metals.

A long axially oriented screw at the bottom of the kiln removed the red-hot barren ash to waste. The vapor phase metals and compounds proceeded into gas cyclones in series. The metals and metal compounds dropped out in declining order of their transition temperatures. Since the last cyclone temperature was just below 300°C, the low transition vapor phase metals and metal compounds were fed into two series scrubbers by induced and forced draft, using air as the conveyor of the vapor phase products. It is imperative if output metals and/or metal compounds are to be combined, that an electrostatic precipitator be used following the scrubbers, rather than separate electrostatic precipitation alone, to recover the total output. Volatile precious metal compounds, such as gold chloride, can remain airborne at room temperatures and can therefore be collected and recovered in production only by electrostatic precipitators. The condensed vapors were collected from each cyclone scrubber and melted separately, producing substantially separate metals and/or metal groups as ingots.

Example 18

Land carbonaceous ore from the U.S. Bureau of Mines at Reno, representative of the Nevada ore anomaly, was ground to minus 100 mesh. The carbonaceous fraction was separated from the silicous gangue by ultrasonic separation followed by conventional flotation, resulting in a black carbonaceous concentrate.

The concentrate, in a 50% solids mix with water, was combined with chemical oxygen carriers, chlorates and nitrates, including wetting agents, until stoichiometric balance was reached. The mixture was aged at a pressure of 5 atmospheres (65 psi) overnight. Additional pure graphite and additional oxygen carriers, at equivalent weights and binder, e.g., water soluble casein glue or polyvinyl chloride in water emulsion were added to the mix.

The resulting concentrate paste was molded into ½ inch diameter electrodes, dried and baked at 100°C. The electrodes were placed between the holders and the ground clamp of an AC arc welder and ignited. The metals contained went into the vapor phase, leaving only a white silicous ash. Proof of the vapor phase was indicated by the peculiar smell of zinc which was added as a trace, and the metallic taste following the smelling of iron oxide. The metallic vapors readily condensed by the procedure of the previous example.

Example 19

Oxidized carbonaceous ores, again from the Navada anomaly, tan to yellow in color, were ground to minus 100 mesh.

Equal parts of powdered coal and graphite, whose total weight was ⅓ that of the weight of the ore sample, were added and mixed. A saturated solution of sodium chlorate was prepared and added to the ore, coal and graphite, and mixed into a paste having the consistency of loose putty. The mixture was stirred in an evaporation dish in an oven at around 100°C. When dry, a small amount of coal oil or equivalent, equal to 1/6 of the weight of the sample was added. The coal oil permits near homogenous reaction with the oxygen carrier, as both a solution oxygen carrier and an oil soak into the porous carbonaceous particles, making all components intimate. Additional hydrocarbons or carbon in graphite form was added to equal stoichiometric balance less oxygen supplied by the arc atmosphere. Burning from within the electrodes is assured by penetrating arc energy, if the arc form of ignition is to be used.

Half of the mixture was stirred at 100°C until small balls about 1/32 inch in diameter formed, hardened and dried. These balls when ignited by flame, burst into brilliant blue-white particulate plasma. The metals and metal compounds went into the vapor phase, leaving only the barren ash. These results were equal in all respects to the performance of carbonaceous ores.

Liquid sizing was added to the remaining half of the mixture. This was forced into molds and slowly bakehardened into electrodes at 100°C. After hardening, the electrodes were placed into arc circuit and ignited. As before, noble metals were driven into a particulate plasma matrix as metals and/or metal compounds, the ash being barren of noble metal values.

The results were equal to those run on natural, rather than synthetic carbonaceous ores, with only a silicous ash remaining and equal recovery of noble metals from the vapor phase.

Both natural and synthetic composite electrodes in arc produced high temperataure particulate plasma. The resulting metal compound vapors while still very hot were passed through a quartz tube with hydrogen. All vapor phase metal compounds were reduced to elemental very fine powders with the exception of ash inclusions due to flash-over during combustion, such as alkali and alkaline earths, etc.

sufficient aggregate mass to escape the peak reaction energies required to volatilize the particles.

Most compounds of most metals have transition temperatures below 4200°C and therefore enter the vapor phase and are recoverable. For instance, tungsten has a transition temperature of 5927°C whereas tungsten hexachloride has a transition temperature of only 346.7°C.

Using this method, most sought metals go into the vapor phase as compounds and are therefore recoverable. The following table is illustrative:

| Metals | Transition Temperature (°C) | Metal Compounds | Transition Temperature (°C) |
|---|---|---|---|
| Silver | 2212 | Silver chlorate | 270 (decomposes) |
|  |  | Silver nitrate | 444 (decomposes) |
| Gold | 2966 | Gold chloride AuCl | 289.5 (decomposes) |
|  |  | Gold chloride $AuCl_3$ | 265 (decomposes) |
|  |  | Tungsten hexafluoride $WF_6$ | 17.5 |
|  |  | Tungsten hexachloride $WCl_6$ | 346.7 |

Example 20

Perchloric acid was added to composite carbonaceous ore concentrate in ½ inch thick layers. The mixture was raised to ignition temperature, burning to a particle temperature of 2700°C, sufficient to burn off all carbonaceous fractions and leave a metal-rich ash. 2700°C was not hot enough to volatilize metals into the vapor phase particulate plasma under these conditions.

The thick pulp prevented migration to the vapor phase to a large extent. Also the wet acid and water content additionally soaked up available reaction energy and limited the attainable temperature.

Reducing the water content of the pulp, burning in very thin section and spraying the pulp into a kiln with natural gas and air did not materially improve the conditions.

Since the valuable noble metal values remained substantially in the ash, noble metals were recoverable therefrom by fire assay. All metals were recovered quantitatively by simply melting the ash in an electric furnace or by prior art smelting procedures.

Example 21

A saturated solution of oxygen carrier plus wetting agent was added to composite carbonaceous ore concentrate in stoichiometric balance under pressure to assure penetration of oxygen carrier into the porous particles. The mixture was then dried and ignited as fine particles in air suspension by means of a natural gas flame. It burned to a particle temperature of about 4200°C autogenously.

Because of the high energy reaction and release, and the fine particle size, not only was the carbonaceous fraction burned to carbon dioxide and water, but the release of energy was enough to volatilize as particulate plasma most metal forms into the vapor phase. Alkali and alkaline-earth oxides, silicon, aluminum, rare earth and uranium oxides were vaporized incompletely or not at all. If desired, these metals are recoverable from the ash.

If recoverable metals are reduced to elemental metals and not easily oxidized, i.e., if they can survive the strong oxidizing atmosphere of this method, they must have either transition temperatures above 4200°C or

Example 22

A number of parallel chemical reactions may occur in the present invention which may be utilized to provide energy for combustion. In creating atmospheric particulate plasma and ash from the composite concentrates, gaseous intermediate products, such as $Cl_2$, $F_2$, $O_2$, $O_3$ and $H_2$, are formed. $Cl_2$ and $F_2$ react with $H_2$ to produce additional heat energy to assist in reaction to the particulate plasma state, also producing hydrochloric and hydrofluoric acids, which report in the scrubbers. Additional $H_2$ combines with carbon to form methane, $CH_4$. Additional $O_2$ and $O_3$ combine with methane to produce heat energy, $CO_2$ and water in the oxidizing reaction.

This suggests a gas-solid particulate plasma process where $Cl_2$ or $F_2$ can be absorbed into the porous openings of the carbonaceous particles as solution oxygen carriers do in solution. Adding $H_2$ and igniting produces additional heat to drive particles into particulate plasma. Additional $H_2$ would consume the carbon and form methane, which is a reducing reaction suggesting ash recovery of metals. Additional $O_2$ or $O_3$, further downstream, would produce heat, $CO_2$ and $H_2O$, which is an oxidizing reaction, suggesting vapor phase recovery of metals.

The gases can be contained separately or combined in proximity to each other and to the carbonaceous particles by mixing the gases with organic or inorganic bubbles of foam, wet or dried, prior to ignition to react to form particulate plasma from solid-gas reaction media.

Accordingly, it will be seen that the present invention provides a novel metal recovery method having a number of advantages and characteristics, including those herein pointed out and others which are inherent in the invention. It is contemplated that a number of modifications of the herein described process will be apparent to those skilled in the art and that such changes may be made without departing from the spirit of the invention or the scope of the appended claims.

What is claimed is:

1. A method of treating noble metal containing sea carbonaceous ore having therein noble metal containing composite organic materials and gangue fractions, including sand and shells, to produce therefrom elemental noble metals, noble metal oxides and other noble metal compounds, said method comprising:

stripping said noble metal containing composite organic materials, having therein naturally occurring carbonaceous reducing agent components, from said gangue fractions to form a carbonaceous concentrate;

treating said noble metal containing composite organic materials with a strong oxidizing agent in amounts substantially stoichiometrically balanced with said carbonaceous reducing agent components of said composite organic materials;

heating said treated composite materials until said materials autogeneously ignite;

allowing complete combustion of said carbonaceous reducing agent components and said strong oxidizing agent in said treated composite materials, whereby the energy released by said autogeneous ignition is sufficient to drive all said noble elemental metals, noble metal oxides and other noble metal compounds into the vapor phase to produce thereby a particulate plasma with solid non-combustible residues remaining in the form of an ash; and recovering from the vapor phase said noble elemental metals, noble metal oxides and other noble metal compounds.

2. The method claimed in claim 1 wherein said noble metal containing composite organic materials are separated from said gangue fractions by mechanical scrubbing.

3. The method claimed in claim 1 wherein said noble metal containing composite organic materials are separated from said gangue fractions by flotation.

4. The method claimed in claim 1 wherein said carbonaceous concentrate is treated with a wetting agent prior to heating, whereby the intimacy of said strong oxidizing agent with said carbonaceous cooncentrate is increased to provide a more efficient combustion.

5. The method claimed in claim 1 wherein said carbonaceous concentrate is placed under greater than atmospheric pressure prior to heating, whereby the intimacy of said strong oxidizing agent with said carbonaceous concentrate is increased to provide a more efficient combustion.

6. The method as claimed in claim 1 wherein said recovery is carried out by means of fractional condensation whereby said noble elemental metals, noble metal oxides, and other noble metal compounds are sequentially recovered in approximate declining order of their transition temperatures.

7. The method as claimed in claim 6 wherein said recovery by fractional condensation is carried out by means of scrubbers.

8. The method as claimed in claim 6 wherein said recovery by fractional condensation is carried out by means of electrostatic precipitors.

9. The method as claimed in claim 6 wherein said recovery by fractional condensation is carried out by means of cyclones.

10. The method as claimed in claim 1 further comprising collecting said solid noncombustible residues remaining from said combustion and recovering therefrom refractory metals.

11. The method claimed in claim 1 wherein said strong oxidizing agent is an inorganic chlorate.

12. The method as claimed in claim 11 wherein said inorganic chlorate comprises perchloryl fluoride.

13. The method claimed in claim 1 wherein said strong oxidizing agent is an inorganic perchlorate.

14. The method claimed in claim 1 wherein said strong oxidizing agent is an inorganic nitrate.

15. The method as claimed in claim 1 wherein said strong oxidizing agent is selected from the group consisting of:
oxygen, ozone and fluorine.

16. The method as claimed in claim 1 further comprising, adding prior to said combustion a reducing agent, at least a portion of which is in the form of a high initial flash point liquid hydrocarbon, wherein said reducing agent serves to augment said naturally occurring carbonaceous reducing agent components of said composite organic materials.

17. The method as claimed in claim 1 further comprising providing an oxygen atmosphere to said treated composite organic materials prior to said autogeneous ignition.

18. The method as claimed in claim 1 further comprising grinding said composite organic materials to approximately 100 mesh prior to said autogeneous ignition.

19. The method as claimed in claim 1 wherein said strong oxidizing agent is produced autogeneously by electrolysis.

20. The method as claimed in claim 1 further comprising treating said sea carbonaceous ore with chlorine, whereby said separation of composite organic materials from said gangue is enhanced.

21. The method as claimed in claim 20 further comprising treating said sea carbonaceous ore with an hydroxide together with said chlorine and heating, whereby said strong oxidizing agent is produced in hot solution.

22. The method as claimed in claim 1 further comprising providing gaseous hydrogen to said treated composite materials prior to ignition thereof to react with chlorine or fluorine gas present or produced during combustion.

23. The method as claimed in claim 22 wherein said provided gaseous hydrogen is contained in an encapsulating foam substance, whereby said hydrogen may react with said carbonaceous solids in a stoichiometric solid-gas reaction to drive said noble metals and noble metal compounds into the vapor phase.

24. The method as claimed in claim 1 wherein said strong oxidizing agent is selected from the group consisting of:
an inorganic chlorate, an inorganic perchlorate, an inorganic hypochlorite, and a permanganate.

25. A method of treating noble metal containing land carbonaceous ore having therein noble metal containing composite organic materials including naturally occurring carbonaceous reducing agent components to produce therefrom elemental noble metals, noble metal oxides and other noble metal compounds, said method comprising:

crushing said mined noble metal containing land carbonaceous ore to produce ore particles;

fracturing along mineralized boundaries of said ore particles to remove magnetite from said crushed land carbonaceous ore;

floating said crushed, demagnetized land carbonaceous ore;

treating said noble metal containing composite organic materials with a strong oxidizing agent, said oxidizing in amounts substantially stoichiometrically balanced with said carbonaceous reducing agent components of said composite organic materials;

heating said treated composite materials until said materials autogenously ignite;

allowing complete combustion of said carbonaceous reducing agent components and said strong oxidizing agent in said treated composite materials, whereby the energy released by said autogenous ignition is sufficient to drive all said noble metal compounds into the vapor phase to produce thereby a particulate plasma with solid non-combustible residues remaining in the form of an ash; and recovering from the vapor phase said noble elemental metals, noble metal oxides and other noble metal compounds.

26. A method of treating noble metal containing noncarbonaceous land ore having therein noble metal containing composite organic materials, but substantially lacking in carbonaceous reducing agent components to produce therefrom noble elemental metals, noble metal oxides and other noble metal compounds, said method comprising:

crushing said noncarbonaceous land ore to produce ore particles;

fracturing along mineralized boundaries of said ore particles to remove magnetite from said crushed noncarbonaceous land ore;

adding a reducing agent to establish a reducing agent content sufficient to permit an autogenous oxidation-reduction reaction of a temperature above the transition temperature of said noble elemental metals, noble metal oxides and other noble metal compounds sought to be recovered;

treating said noble metal containing composite organic materials with a strong oxidizing agent in amounts substantially stoichiometrically balanced with said added reducing agent;

heating said treated composite materials until said materials autogenously ignite;

allowing complete combustion of said added reducing agent and said oxidizing agent, whereby the energy released by said autogenous ignition is sufficient to drive all said noble elemental metals, noble metal oxides and other noble metal compounds into the vapor phase to produce thereby a particulate plasma with solid noncombustible residues remaining in the form of an ash; and recovering from the vapor phase said noble elemental metals, noble metal oxides and other noble metal compounds.

27. The method as claimed in claim 26 wherein said added reducing agent comprises a carbonaceous substance.

28. A method of treating ores comprised of metal-containing composite organic materials and associated inorganic materials to produce therefrom elemental metals and other metal compounds, said method comprising:

separating said composite organic materials from said associated inorganic materials by applying ultrasonic energy to water in which said ores are immersed to bring about separation of said composite organic materials from said inorganic materials.

treating said composite materials with a predetermined amount of an oxidizing agent to produce a treated composite material;

igniting said materials and allowing substantially complete combustion thereof; and collecting the solid combustion residues of said materials for subsequent reduction of a portion thereof to the elemental metals which formed the metal component of said composite materials.

29. A method of treating noble metal-containing, composite organic materials to produce therefrom elemental noble metals, noble metal oxides and other noble metal compounds, said method comprising:

treating a mass of said composite materials with a water-immiscible, volatile organic cleaning agent;

removing at least a major portion of said cleaning agent after said materials and said cleaning agent have been in contact with each other;

treating said composite materials with a strong oxidizing agent;

heating said treated composite materials to at least 200°C to remove substantially all of said oxidizing agent remaining after treatment of said materials;

continuing to heat said materials at at least about 200°C until said materials spontaneously ignite;

allowing complete combustion of said materials; and collecting the solid combustion residues of said materials for subsequent reduction to the noble metals which formed the noble metal component of said composite materials.

30. A method of recovering and treating noble metal-containing, composite organic materials to produce therefrom elemental metals and other metal compounds, said method comprising:

separating said composite organic materials from whole ores by flotation of said composite organic materials atop a mass of water;

treating said composite materials with a water-immiscible, volatile organic solvent while said materials are atop said mass of water to clean associated inorganic materials from said organic composite material for density difference separation of said inorganic materials after removal thereof;

removing said cleaned organic composite materials and said solvent, after solvent treatment of said composite materials, to remove a major portion of said solvent from said composite materials while allowing a substantial portion of any water associated with said composite materials to remain associated therewith;

treating said composite materials with an aqueous solution of a strong oxidizing agent;

heating said thus treated composite materials to a temperature of from about 200°C to about 250°C to remove therefrom substantially all of said oxidizing agent remaining after treatment of said materials;

continuing to heat said materials at said 200°C to 250°C until said materials spontaneously ignite;

allowing complete combustion of said materials; and collecting the solid combustion residues of said materials for subsequent reduction to the noble metals which formed the noble metal component of said composite materials.

31. A method as defined in claim 30 which further includes, prior to separation of said organic composite material from said whole ores, treating an aqueous mixture of said whole ores with a minor proportion of hydrochloric acid.

32. A method of treating noble metal containing sea carbonaceous ore having therein noble metal containing composite organic materials and gangue fractions, including sand and shells to produce therefrom elemental noble metals, noble metal oxides and other noble metal compounds, said method comprising:

stripping said noble metal containing composite organic materials having therein naturally occurring carbonaceous reducing agent components from said gangue fractions to form a carbonaceous concentrate;

treating said noble metal containing composite organic materials with a strong oxidizing agent in amounts substantially stoichiometrically balanced with said carbonaceous reducing agent components of said composite organic materials;

adding graphite to said so treated noble metal containing composite organic materials in an amount sufficient to conduct electricity and substantiallly agitating sufficient to form a mixture;

forming electrodes from said graphite and composite organic materials mixture;

igniting said electrodes autogeneously by electric arc, wherein the energy released by said autogenous ignition is sufficient to drive all said noble elemental metals, noble metal oxides and other noble metal compounds into the vapor phase to produce thereby a particulate plasma with solid noncombustible residues remaining in the form of an ash; and recovering from the vapor phase said noble elemental metals, noble metal oxides and other noble compounds.

33. The method claimed in claim 32 further comprising placing said graphite-composite mixture electrodes in an oxygen atmosphere prior thereof said autogenous ignition thereof by said electric arc, whereby ozone is created to produce very high energy particulate plasma levels thereby to oxidize entirely said composite material.

34. The method as claimed in claim 32 wherein said vapor phase is collected in a reducing atmosphere immediately following vaporization.

* * * * *

UNITED STATES PATENT OFFICE
CERTIFICATE OF CORRECTION

Patent No. 3,979,205          Dated September 7, 1976

Inventor(s) Fritz W. Wanzenberg

It is certified that error appears in the above-identified patent and that said Letters Patent are hereby corrected as shown below:

Col. 17, line 43, "benzen" should read --benzene--

Col. 20, line 11, "alo" should read --also--

Col. 27, line 7, "though" should read --thought-- line 53, "have" should read --has--

Col. 30, line 40, "oreder" should read --order-- line 42, "factory" should read --refactory--

Col. 31, line 12, "as the" should read --as in the--

Col. 39, line 38, "cooncentrate" should read --concentrate--

Col. 40, line 53, "or" should read --ore--

Column 34 should read as per attachments.

Signed and Sealed this

Tenth Day of May 1977

[SEAL]

*Attest:*

RUTH C. MASON          C. MARSHALL DANN
*Attesting Officer*          *Commissioner of Patents and Trademarks*

272 is driven by a motor 274, and the shaft 272 includes
first and second rubber or other flexible impeller elements 276 and 278, with a center impeller spacer 280 disposed therebetween. Inner margins 282 and 284, respectively of the end walls 266 and 268 define openings through
which communication is established from an inlet area 286
to the interior 288 of the separator casing 264, and from
the interior 288 to a pump inlet tube 290. The pump assembly 292 includes a rotary impeller 294 driven by the shaft
272. The interior 288 of the separator 134 communicates
with a sump 296 in which sand and other dense particles
may accumulate. In the use of the separator 134, actuation of the motor 274 causes the shaft 272 to rotate, and
a centrifugal force is applied by the impellers 276 and
278 to the fluid trapped within the body. As the more
dense particles tend to move radially outwardly of the
housing 264, they are rolled or scrubbed by the rubber
impellers 276, 278 along the faces of the end walls 266,
268, with the radial grooves 270 permitting inorganic
particulate matter to escape therealong into the area of
the sump 296. The less dense material proceeds generally
axially of the separator 134, and through the outlet
defined by the margins 284, inasmuch as a downstream low
pressure area exists within the transfer pump 292. The
larger, more dense, inorganic parts of the mixture transferred by the separator 134 remain in the radially outer
or sump portions of the pump unit, while the less dense,
organic or organometallic compounds, salts, water, etc.,
proceed through the inlet 290, to the pump 292 and thence
back to the mixer tank 140 or the like.

As noted in Fig. 2A, the sump 296 may be connected
through line 298 to the storage bin 124 which accumulates
sand and shells for eventual discarding. As pointed out
above, the provision of the rubber impellers 276 and 278
and the arrangement thereof so that the impellers rub
against the faces of the end walls 266 and 268 provides a
mechanical rolling and scrubbing action which is the
equivalent of chemical or ultrasonic separation of the
organic portions of the ore from the inorganic portions
thereof. Accordingly, this form of separator is preferred
where ultrasonic or protracted chemical separation is not
feasible for one reason or another.

STOICHIOMETRICALLY BALANCED EMBODIMENTS

When in the foregoing examples stoichiometric proportions of the carbonaceous fuel fraction and the oxygen
carriers are utilized, ignition of the stoichiometrically
balanced particles (or stoichiometrically balanced electrodes if electric arc ignition is used) causes auto-combustion into particulate plasma, driving noble metals into the vapor phase as metals and/or metal compounds, leaving the barren ash devoid of these noble metals. The metals and/or metal compounds may be readily recovered from the vapor phase by fractional condensation.

The following examples represent the optimum methods for recovering all metals of value from carbonaceous, oxidized carbonaceous and/or some inorganic ores. The flow chart of Fig. 5 is meant to be illustrative of these stoichiometrically balanced embodiments of the present invention.

Example 17

Rough sea carbonaceous ore was first floated from the gangue, in sea water media, by velocity separation